United States Patent
Tokoro et al.

[11] Patent Number: 5,622,756
[45] Date of Patent: Apr. 22, 1997

[54] EXPANSION-MOLDED ARTICLE OF POLYOLEFIN RESIN HAVING OPEN VOIDS

[75] Inventors: Hisao Tokoro, Kamikawachi-machi; Satoru Shioya; Akira Hinokawa, both of Utsunomiya, all of Japan

[73] Assignee: JSP Corporation, Tokyo, Japan

[21] Appl. No.: 439,785

[22] Filed: May 12, 1995

[30] Foreign Application Priority Data

| Aug. 16, 1994 | [JP] | Japan | 6-214279 |
| Aug. 23, 1994 | [JP] | Japan | 6-221167 |
| Dec. 12, 1994 | [JP] | Japan | 6-332103 |
| Mar. 7, 1995 | [JP] | Japan | 6-074638 |

[51] Int. Cl.$^6$ .................................................. B29D 22/00
[52] U.S. Cl. .................... 428/36.5; 428/220; 428/313.5; 428/314.2; 428/316.6
[58] Field of Search ................... 428/36.5, 402, 428/403, 407, 316.6, 313.5, 314.2, 314.8, 220

[56] References Cited

U.S. PATENT DOCUMENTS

| 4,692,507 | 9/1987 | Akiyama et al. | 528/481 |
| 4,755,408 | 7/1988 | Noël | 428/36.5 |
| 5,284,431 | 2/1994 | Kuwabara et al. | 425/148 |
| 5,340,841 | 8/1994 | Tokoro et al. | 521/60 |

*Primary Examiner*—Kathleen Choi
*Attorney, Agent, or Firm*—Sherman and Shalloway

[57] ABSTRACT

An expansion-molded article of a polyolefin resin, which is high in fusion-bonding strength and excellent in water permeability and compressive strength and has open voids, and a production process thereof are disclosed. The expansion-molded article is made of tubular foamed particles with a through-hole, whose $d_{MIN}$ is at least 1.5 mm and whose $d_{MIN}/D_{MIN}$ value is 0.25–0.85 wherein $d_{MIN}$ is a minimum diameter of the hole in sections perpendicular to the direction of the hole and $D_{MIN}$ is a minimum outer diameter of the foamed particle in a section that $d_{MIN}$ has been provided. The production process includes filling the tubular foamed particles with a through-hole, whose $d_{MIN}$ and $d_{MIN}/D_{MIN}$ are at least 1.5 mm and 0.25–0.85, respectively, into a mold and then molding the foamed particles under heat, whereby the foamed particles are fusion-bonded to one another.

7 Claims, 9 Drawing Sheets ced-Open No. 153026/1992. Therefore, this process is

EXPANSION-MOLDED ARTICLE OF POLYOLEFIN RESIN HAVING OPEN VOIDS

BACKGROUND OF THE INVENTION

1. Field of the Invention

The present invention relates to an expansion-molded article of a polyolefin resin, which has open voids, and is good in water permeability, air permeability and sound absorbing quality, and suitable for use, in particular, as a draining material, wall covering material, core material and the like, and a production process thereof.

2. Description of the Background Art

In recent years, water-permeable expansion-molded articles having open voids have come to be used as drainage-accelerating materials at places such as golf links, riding grounds and bridle paths in riding clubs, etc., of which high drainage performance is required, underlay materials for drainage of artificial lawn in roof gardens, and the like. Expansion-molded articles of this kind have been proposed in Japanese Patent Application Laid-Open Nos. 153026/1992 and 177723/1993.

However, the former molded article is formed by bonding foamed particles of a polystyrene to one another with a polyolefin resin. This molded article is produced by first mixing the foamed particles with an aqueous dispersion of the polyolefin resin, filling the resulting mixture into a mold to heat it and then cooling and solidifying it. Therefore, this process is complicated in production process, takes a long time to mold and is also poor in productivity compared with a process in which foamed particles are filling into a mold as they are, thereby molding them. In addition, this process also has involved a shortcoming that although the bond strength among the foamed particles depends on the strength of a film of the polyolefin resin formed on the surfaces of the foamed particles, this film is thin and tends to be broken, and so sufficiently high bond strength cannot be achieved among the foamed particles.

Besides, the molded article described in the latter is formed by filling a great number of foamed chips in an aspherical form, the length of the longest part of which is at least 2 cm, into a mold and then heating them, thereby fusion-bonding the chips to one another. Since the length of the longest part of the foamed chip is as long as at least 2 cm, scattering tends to occur in the size of voids defined among the foamed chips upon filling the chips into the mold, and so the filling density of the chips tends to vary with a difference in position among the chips filled in the mold. In addition, since the filling density varies every filling, it is difficult to uniformly fill the chips into the mold, and so difficulties are encountered on controlling the filling factor of the chips to a specific value. Therefore, it is difficult to control void content to a fixed value and to obtain a molded article having a uniform void content. Accordingly, it has been impossible to provide a molded article having uniform water permeability. Further, there has also been offered a problem that since the proportion of contact area among the chips is low, the bond strength among the chips is low, and so the whole expansion-molded article becomes brittle and easy to be broken.

On the contrary, an expansion-molded article of a polyolefin resin, which was previously proposed by the present applicants (Japanese Patent Application Laid-Open No. 224727/1991), is obtained by mutually fusion-bonding columnar foamed particles of the polyolefin resin, whose L/D is 2–10 wherein L is a length of the longest part of the foamed particle, and D is a sectional length of the largest barrel part, with their surfaces turned in irregular directions. This molded article has no need to separately use an adhesive for mutually bonding the foamed particles unlike the molded article described in Japanese Patent Application Laid-Open No. 153026/1992. Therefore, this process is simple in production process and excellent in productivity. Moreover, since the foamed particles are directly fusion-bonded to one another, breakage near interfaces among the foamed particles does not easily occur, and so the strength of the molded article is high. Besides, since the foamed particles are in the form of a column in which L/D is 2–10, and are simple in shape, they can be filled into the mold with a comparatively uniform density. Therefore, the void content of the resulting molded article is comparatively uniform at all positions of the molded article, and the void contents of individual molded articles are also comparatively constant.

However, if a molded article having sufficient water permeability is intended to provide in the molded article described in Japanese Patent Application Laid-Open No. 224727/1991, it is necessary to preset the pressure of steam upon molding the foamed particles low to prevent secondary expansion. As a result, the fusion-bonding strength among the foamed particles becomes low, and the compressive strength of the molded article is also lowered. If the molded article is intended to have high fusion-bonding strength among the foamed particles, and the pressure of steam upon molding is hence preset high on the contrary, even spaces to become voids are filled, resulting in a molded article insufficient in water permeability. It has hence been difficult to provide an excellent molded article which can satisfy both good water permeability in the molded article, and high fusion-bonding strength among the foamed particles and compressive strength of the molded article at the same time.

On the other hand, when a styrene resin is used as a base resin, an expansion-molded article with voids can be obtained with comparative ease by filling foamed particles thereof into a mold and heating them as described in Japanese Patent Application Laid-Open No. 134877/1994.

However, since there are the following points of difference between foamed particles of a polystyrene resin and foamed particles of a polyolefin resin, the technique for the polystyrene resin cannot be simply applied to the polyolefin resin. More specifically, the first point of difference between the foamed particles of the polystyrene resin and the foamed particles of the polyolefin resin is that temperatures at which fusion bonding is feasible are different, and so the latter foamed particles are required to heat at a higher temperature. The second point of difference is that the foamed particles of the polyolefin resin are poorer in secondary expandability than the foamed particles of the polystyrene resin. Incidentally, the term "secondary expandability" as used herein means expandability in the reexpansion of the foamed particles, which occurs at the time the foamed particles are filled into a mold and heated with a heating medium, thereby fusion-bonding the foamed particles to one another. The third point of difference is that in the case where the polyolefin resin is used as a base resin, the shrinkage of a molded article obtained after molding under heat becomes more marked than the case where the polystyrene resin is used.

These points of difference make it difficult to integrally mold the foamed particles of the polyolefin resin by filling them into a mold and heating them. Therefore, in order to enhance the secondary expandability of the foamed particles which are starting materials for the production of an expansion-molded article, there has been need for a pretreatment such as a pressurizing treatment of the foamed particle in a pressure tank, and besides it has been necessary to improve a mold and/or devise a heating method in order to improve the fusion bonding property of the foamed particles, or to investigate aging conditions in order to recover the shrinkage of a resulting molded article. With respect to the base resin of the foamed particles, there has also been need for regulation in due consideration of the secondary expandability of the foamed particles, the shrinkage of the molded article, etc. In particular, when it has been necessary to ensure that open voids are provided, and enhance the fusion bonding property of the foamed particles, the above-mentioned points of difference between the foamed particles of the polyolefin resin and the foamed particles of the polystyrene resin have become a serious problem upon molding. Therefore, there has been need to reconsider all aspects including the shape of the foamed particles, heating conditions, secondary expandability, fusion bonding property and the like. Accordingly, it has heretofore been believed that difficulties are encountered on the provision of an expansion-molded article of the polyolefin resin, which is satisfactory in both void content and fusion bonding property among the foamed particles of the polyolefin resin, by a process of filling the foamed particles into a mold to mold them under heat.

SUMMARY OF THE INVENTION

The present invention has been completed with a view toward solving the above-described problems and has as its object the provision of an expansion-molded article of a polyolefin resin, which is obtained by filling foamed particles of the polyolefin resin into a mold and fusion-bonding them to one another under heat, scarcely undergoes shrinkage, is satisfactory in physical properties as to both voids and fusion-bonding strength among the foamed particles and has open voids, and a production process thereof.

According to the present invention, there is thus provided an expansion-molded article of a polyolefin resin, which is obtained by filling foamed particles of the polyolefin resin into a mold and fusion-bonding them to one another under heat and has open voids, wherein the foamed particles are tubular foamed particles with a through-hole, whose $d_{MIN}$ is at least 1.5 mm and whose $d_{MIN}/D_{MIN}$ value is 0.25–0.85, in which $d_{MIN}$ is a minimum diameter of the hole in sections perpendicular to the direction of the hole and $D_{MIN}$ is a minimum outer diameter of the foamed particle in a section that $d_{MIN}$ has been provided.

According to the present invention, there is also provided a process for the production of an expansion-molded article of a polyolefin resin with open voids, which comprises filling tubular foamed particles of the polyolefin resin with a through-hole, whose $d_{MIN}$ is at least 1.5 mm and whose $d_{MIN}/D_{MIN}$ value is 0.25–0.85, wherein $d_{MIN}$ is a minimum diameter of the hole in sections perpendicular to the direction of the hole and $D_{MIN}$ is a minimum outer diameter of the foamed particle in a section that $d_{MIN}$ has been provided, into a mold and then molding the foamed particles under heat, whereby the foamed particles are fusion-bonded to one another.

BRIEF DESCRIPTION OF THE DRAWINGS

The above and other objects, features and advantages of the present invention will becomes apparent from the following description of the invention and the appended claims, taken in conjunction with the accompanying drawings, in which:

DETAILED DESCRIPTION OF THE INVENTION AND PREFERRED EMBODIMENTS

Figure 1A:
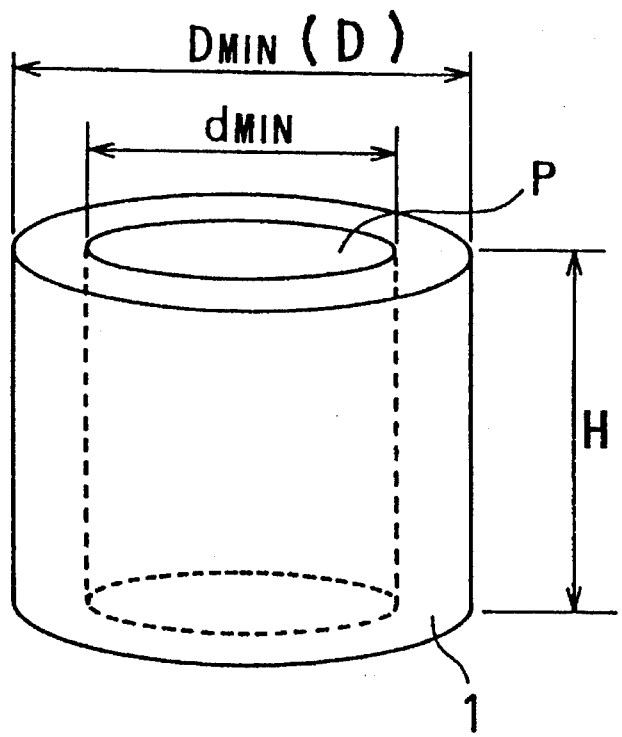
FIGS. 1A, 1B and 1C are perspective views separately illustrating various embodiments as to general shapes of foamed particles used in the production of expansion-molded articles of a polyolefin resin according to the present invention.
Figure 1B:
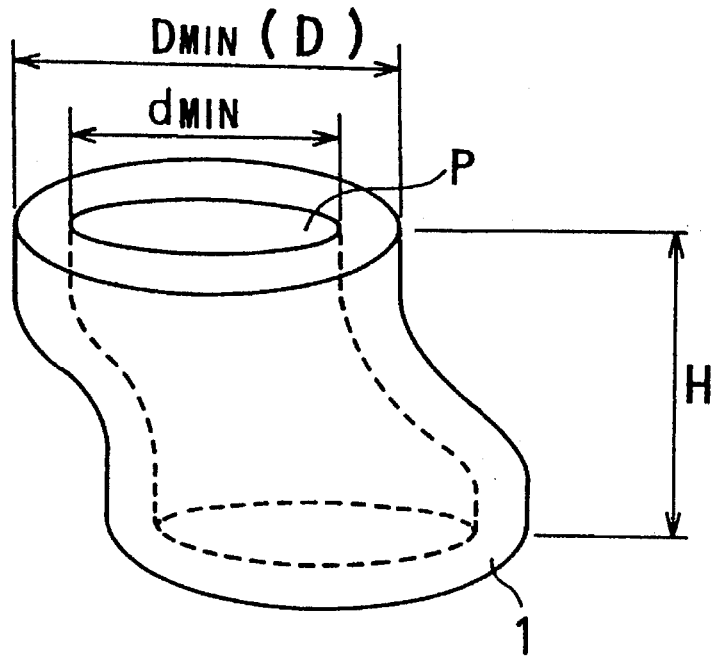
Figure 1C:
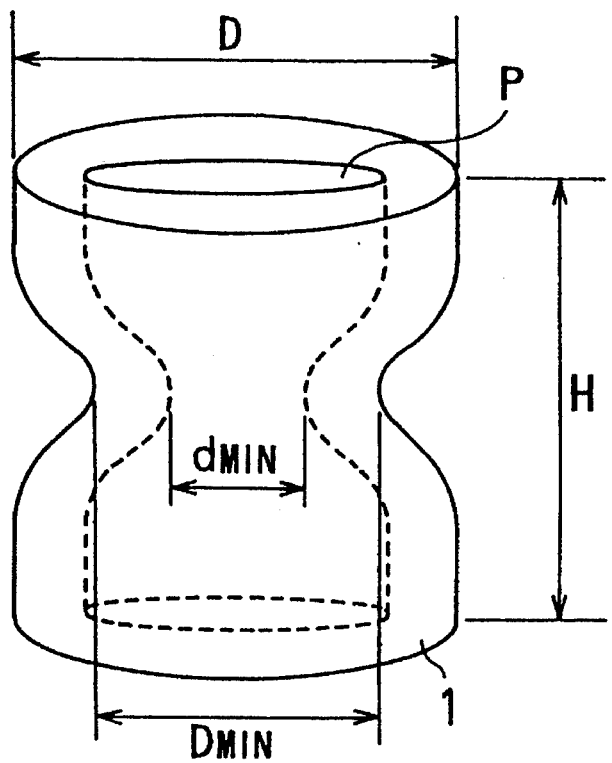

The present invention will hereinafter be described in detail by reference to the drawings. FIGS. 1A, 1B and 1C illustrate general shapes of foamed particles used in the production of expansion-molded articles of a polyolefin resin having open voids according to the present invention. In the present invention, the tubular foamed particle means a particle having a hollow structure in which the cavity part (hereinafter referred to as the hole P) extends through the foamed particle 1 as illustrated in FIGS. 1A to 1C.

More specifically, foamed particles used in the present invention are those having a straight form in which the foamed particle always has fixed hole diameter and outer diameter in any section perpendicular to the direction of the hole P as illustrated in FIG. 1A, those having a curved form in which the foamed particle always has fixed hole diameter and outer diameter in any section perpendicular to the direction of the hole P as illustrated in FIG. 1B, and those having a varying-diameter tubular form in which the diameter of the hole P and the outer diameter of the foamed particle are irregular as illustrated in FIG. 1C. In the drawings, $d_{MIN}$ means a minimum diameter (hereinafter referred to as the minimum hole diameter) among diameters of the hole in sections perpendicular to the direction of the hole in the foamed particle and $D_{MIN}$ denotes a minimum diameter (hereinafter referred to as the minimum outer diameter) among outer diameters of the foamed particle in a section that $d_{MIN}$ has been provided. Besides, H means a height of the particle, and D denotes a maximum diameter among diameters of the foamed particle in the sections perpendicular to the direction of the hole in the particle.

Figure 2A:
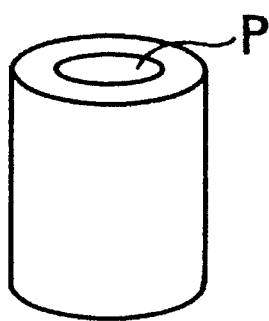
FIGS. 2A, 2B, 2C, 2D, 2E, 2F, 2G, 2H, 2I, 2J, 2K, 2L, 2M, 2N and 2O are perspective views separately illustrating various embodiments as to specific shapes of foamed particles used in the present invention.
Figure 2B:
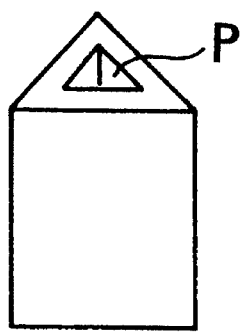
Figure 2C:
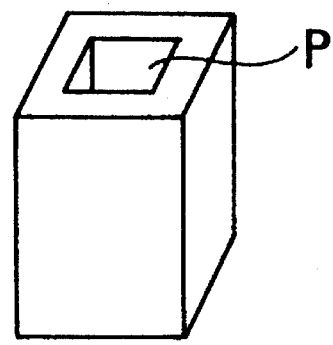
Figure 2D:
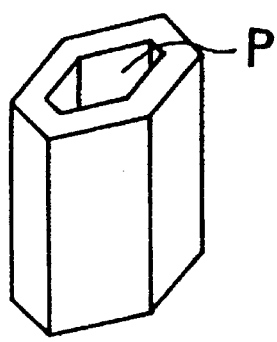
Figure 2E:
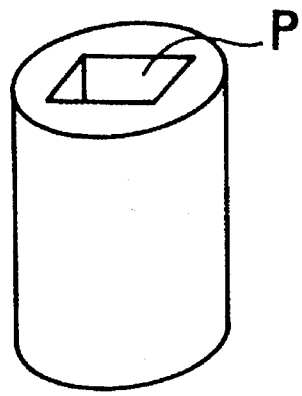
Figure 2F:
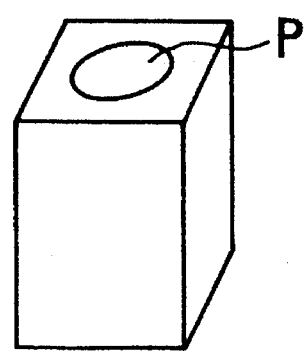
Figure 2G:
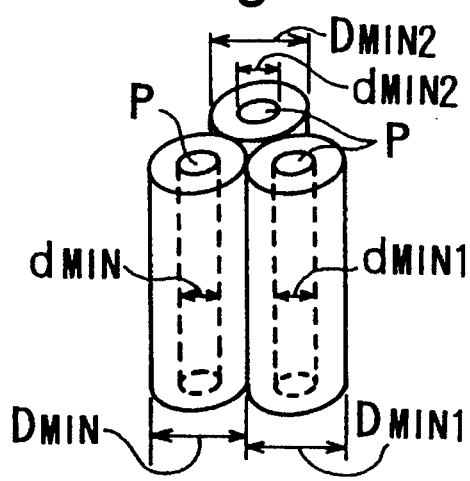
Figure 2H:
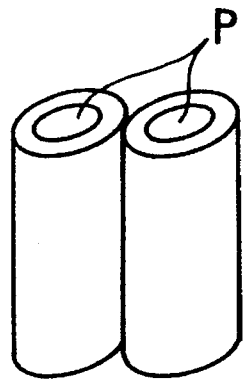
Figure 2I:
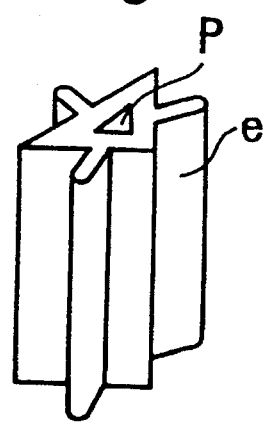
Figure 2J:
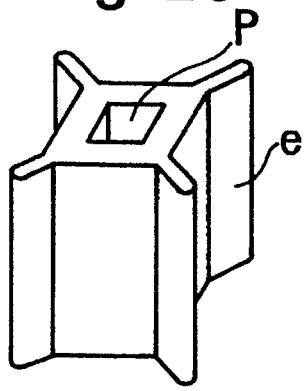
Figure 2K:
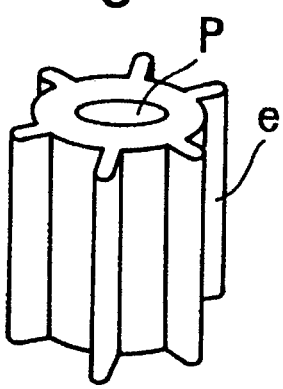
Figure 2L:
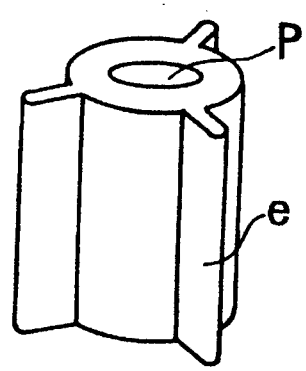
Figure 2M:
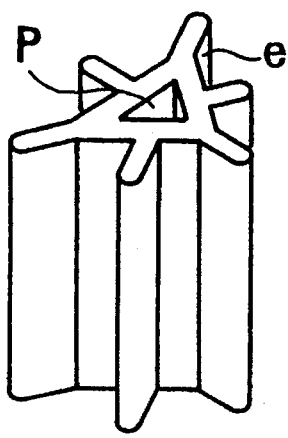

Examples of the foamed particles having the tubular form as described above include:

I. a foamed particle in which both external shape and hole shape in any section perpendicular to the direction of the hole P are circular (FIG. 2A);

II. foamed particles in which both external shape and hole shape in any section perpendicular to the direction of the hole P are polygonal (FIGS. 2B to 2D);

III. a foamed particle in which the external shape and hole shape in any section perpendicular to the direction of the hole P are circular and polygonal, respectively (FIG. 2E);

IV. a foamed particle in which the external shape and hole shape in any section perpendicular to the direction of the hole P are polygonal and circular, respectively (FIG. 2F); and V. foamed particles in which a plurality of such foamed particles as described in the above I to IV is bonded to each other at their outer surfaces (FIGS. 2G and 2H).

In the present invention, the foamed particles having any of the above-described sectional forms can be used.

Figure 2N:
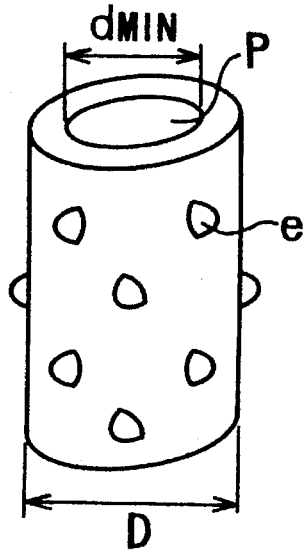
Figure 2O:
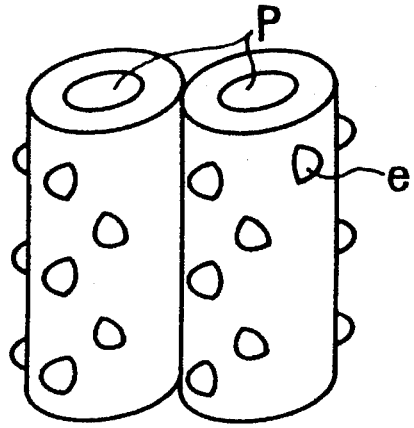

In the present invention, there may also be used the following foamed particles:

VI. foamed particles in which continuous projections e are provided on the peripheral surface of the foamed particles in the forms of the above I to V (FIGS. 2I to 2M); and VII. foamed particles in which discontinuous projections e are provided on the peripheral surface of the foamed particles in the forms of the above I to V (FIGS. 2N and 2O).

The foamed particles illustrated in FIGS. 2A to 2O are such that the particles always have fixed hole diameter and outer diameter in any section perpendicular to the direction of the hole P as illustrated in FIG. 1A. There may also be used those obtained by deforming the foamed particles separately having the hole shapes and external shapes as illustrated in FIGS. 2A to 2O into curved forms as illustrated in FIG. 1B or into varying-diameter tubular forms, in which the diameter of the hole P and the outer diameter of the foamed particle are irregular, as illustrated in FIG. 1C though they are not expressly illustrated.

The above-described embodiments are described by way of example, and besides the above, the foamed particles according to the present invention include those in which the external shape in a section perpendicular to the direction of the hole P is oval, those in which the hole shape in the section is oval, those in which the center of the hole in the section is deviated, those having a form that a tubular foamed particle is twisted, etc. Namely, the foamed particles according to the present invention are not limited to the illustrated foamed particles so far as they are in a tubular form.

Among the foamed particles in the forms exemplified above, those in which any projection e is not provided and both external shape and hole shape are circular as illustrated in FIGS. 2A, 2G and 2H are particularly preferred in the present invention. Such foamed particles are produced with comparative ease, cause no clogging of a feeder upon their filling into a mold, and are easy to be filled with a uniform density at any position within the mold and to be controlled in their filling factor, and so the void content of the resulting molded article is easy to exactly control.

By the way, the filling factor (%) is expressed by a percentage of a quotient obtained by dividing the true volume (cm$^3$) of the foamed particles filled into the mold by the volume (cm$^3$) of a mold cavity. The filling factor of the foamed particles filled into the mold can be controlled by a method in which a charging air pressure is suitably controlled according to the true density and shape of the foamed particles and the like, a method in which the spacing of a cracking in the mold is controlled, or the like. The cracking means a spacing part of the mold, which serves to prevent the complete closing of the mold for discharging air within the mold out of the mold upon filling the foamed particles into the mold and/or effectively filling the foamed particles into the mold. The cracking is closed when the foamed particles are molded after filled into the mold.

In the present invention, foamed particles whose minimum hole diameter $d_{MIN}$ is at least 1.5 mm, and whose $d_{MIN}/D_{MIN}$ value is 0.25–0.85 are used in molding. The use of the foamed particles constituted in this manner permits the easy provision of an expansion-molded article, which scarcely undergoes shrinkage, has satisfactory voids and exhibits good fusion bonding property among the foamed particles by a process in which foamed particles are filled into a mold and molded under heat.

With respect to the above conditions as to the minimum hole diameter $d_{MIN}$ and $d_{MIN}/D_{MIN}$, in the case where a plurality of holes P exists in a foamed particle, for example, in the case of a foamed particle composed of an aggregate of plural foamed particles mutually bonded as illustrated in FIG. 2G as an example, it is only necessary for the individual holes and particles to satisfy the above conditions, namely, $d_{MIN}$, $d_{MIN1}$ and $d_{MIN2}$ are all at least 1.5 mm and all values of $d_{MIN}/D_{MIN}$, $d_{MIN1}/D_{MIN1}$ and $d_{MIN2}/D_{MIN2}$ are 0.25–0.85. If the projections e are present on the peripheral surface of the foamed particle, the minimum outer diameter excluding the projections is determined as $D_{MIN}$.

If the minimum hole diameter $d_{MIN}$ of the foamed particle is shorter than 1.5 mm, and/or $d_{MIN}/D_{MIN}$ is lower than 0.25, it is difficult to provide a molded article having satisfactory voids by a process in which such foamed particles are molded under heat in a mold. On the other hand, foamed particles having a $d_{MIN}/D_{MIN}$ value exceeding 0.85 are difficult to produce. Molding of such particles under heat in a mold results in a molded even article good in fusion bonding property among the particles, but liable to deform due to the shortage of strength of the particles, defective in dimensional stability and hard to retain evenly distributed voids.

When the foamed particles are constructed in a tubular form, it is possible to control the directional property of the foamed particles filled into a mold by positioning an air outlet such as a vent hole to a fill opening for the foamed particles used upon filling the foamed particles into the mold by an air pressure, and so void content, in particular, the directional property of open voids can be controlled.

The minimum hole diameter $d_{MIN}$ of the foamed particles used in the present invention is preferably at least 2.5 mm, more preferably at least 3.0 mm, while the $d_{MIN}/D_{MIN}$ value is preferably 0.45–0.80, more preferably 0.55–0.80. The minimum hole diameter $d_{MIN}$ is preferably at most 10 mm, more preferably at most 5 mm.

The foamed particles used in the present invention preferably have the following relationship between their bulk density $\rho_1$ and true density $\rho_2$:

$0.25 < \rho_1/\rho_2 < 0.55$.

The expansion-molded article according to the present invention preferably has a coefficient of water permeability of $4.0 \times 10^{-2}$ to $8.0 \times 10^{-1}$ (cm/sec). Such a coefficient of water permeability can be realized with ease by using foamed particles whose minimum hole diameter $d_{MIN}$ is at least 1.5 mm and whose $d_{MIN}/D_{MIN}$ value is 0.45–0.85. In the present invention, the expansion-molded article more preferably has a coefficient of water permeability of $9.0 \times 10^{-2}$ to $8.0 \times 10^{-1}$ (cm/sec). Such a coefficient of water permeability can be realized with ease by using and molding foamed particles whose minimum hole diameter $d_{MIN}$ is at least 2.5 mm and whose $d_{MIN}/D_{MIN}$ value is 0.45–0.85. Since the foamed particles in the tubular form are specially used in the present invention, fusion-bonding strength among the foamed particles forming the molded article is sufficiently high, to say nothing of water permeability. Therefore, the molded article is also excellent in compressive strength. The coefficient of water permeability means a value determined in accordance with the equation of constant water level prescribed in JIS A 1218.

In the present invention, it is only necessary for the expansion-molded article to comprise at least 75 wt. % of the foamed particles in the tubular form.

In order to obtain foamed particles having any of the above-described shapes, resin particles having a form similar to the intended foamed particles are used as particles for the production of the foamed particles. Such tubular resin particles are obtained, for example, by using an extrusion orifice having the same ratio of sectional form as the tubular form of the desired foamed particles as a melt-extrusion orifice in an extruder die at the time a base resin is melted and kneaded in an extruder and the melt is then extruded into a strand from the extruder. In order to prevent the hole in the tubular strand thus extruded from collapsing, a pressure-control orifice is preferably provided within the extrusion orifice (preferably, in the center) to keep the pressure within the hole in the tubular strand to ordinary pressure or higher. This pressure-control orifice is connected to a compressed gas feeder to supply air or the like within the hole in the tubular strand, thereby keeping the interior of the hole at least ordinary pressure. Alternatively, the pressure-control orifice is constructed that it simply communicates with an atmospheric part, whereby the interior of the hole can be kept ordinary pressure.

The tubular strand obtained in the above-described manner is then cooled and cut into predetermined lengths to obtain resin particles. The thus-obtained resin particles are dispersed in a dispersion medium in the presence of a blowing agent in a closed vessel to heat the resultant dispersion to a temperature not lower than a temperature at which the resin particles are softened, thereby impregnating the resin particles with the blowing agent. Thereafter, the vessel is opened at one end thereof so as to release the resin particles and the dispersion medium at the same time into an atmosphere of a pressure lower than the internal pressure of the vessel (usually, under atmospheric pressure) while maintaining the internal pressure of the vessel higher than the vapor pressure of the blowing agent to make the expansion ratio of the resulting foamed particles uniform, whereby foamed particle can be obtained.

Examples of a polyolefin resin used as the base resin for the foamed particles include ethylene-butene copolymers, ethylene-propylene copolymers, propylene-butene copolymers, ethylene-propylene-butene terpolymers, propylene homopolymer, low-density polyethylene, medium-density polyethylene, high-density polyethylene, linear low-density polyethylene, linear ultra-low-density polyethylene, ethylene-vinyl acetate copolymers, ethylene-methyl methacrylate copolymers, ionomer resins obtained by crosslinking molecules of an ethylene-methacrylic acid copolymer with an metallic ion, polybutene-1, polypentene, and ethylene-acrylic acid-maleic anhydride terpolymers. In the case of the copolymers, terpolymers and the like, both block polymers and random polymers may be used.

Although the polyolefin resin may be used without crosslinking it, it may be crosslinked by the addition of a peroxide or the irradiation of radiation. However, the uncrosslinked resin is preferred from the viewpoints of the number of production processes and recycling ability.

Among the above-mentioned base resins, low-density polyethylene, medium-density polyethylene, high-density polyethylene, linear low-density polyethylene, linear ultra-low-density polyethylene, polypropylene, polybutene, ethylene-propylene copolymers, propylene-butene copolymers and ethylene-butene-propylene terpolymers are preferred in that they provide expansion-molded articles good in recovery property after compression.

Of these base resins, ethylene-propylene random copolymers, propylene-butene random copolymers, ethylene-butene-propylene random terpolymers are particularly preferred. When these resins are used as base resins, the compressive strength of the resulting expansion-molded articles when compressed by 5% can be easily enhanced to a value higher than 1.1 kg/cm². Therefore, expansion-molded articles having sufficient compressive strength can be provided. Any expansion-molded article having compressive strength not lower than 1.1 kg/cm² when compressed by 5% has properties of sufficiently withstanding weight load and impact load when used in applications such as drainage equipment which will be described subsequently.

As the base resin for the foamed particles used in the present invention, the above-mentioned, various polymers may be used singly. However, the base resin may contain two or more polymers. In the case where two or more polymers are used, biodegradable plastics such as polycaprolactone, poly($\beta$-hydroxybutylic acid) and/or copolymers thereof, polyvinyl alcohol, polylactic acid and modified starch may be used in combination with the polyolefin resins. In order to impart better flexibility to the molded article according to the present invention, it is further preferable to add 5–40 wt. % of a thermoplastic elastomer such as ethylene-propylene rubber to the base resin.

In the case where the biodegradable plastics are used in combination with the base resin, besides a process in which such a plastic is premixed with the polyolefin resin (base resin) prior to foaming as described above, there may be used a process in which foamed particles of the polyolefin resin and foamed particles of the biodegradable plastic are mixed with each other, and a process in which unfoamed particles of the biodegradable plastic are mixed with the tubular foamed particles of the polyolefin resin.

The tubular resin particles may be obtained, for example, by melting and kneading a masterbatch, to which inorganic substances and the like for addition to the base resin have been added, together with the base resin free of the inorganic substances and the like in an extruder, extruding the melt mixture through an extrusion orifice of a die having the desired sectional form as described above, cooling the melt mixture and then cutting it into predetermined lengths. In the case where the resin particles are obtained in this process, the resin particles are cut in such lengths that tubular foamed particles obtained by foaming the resin particles at a predetermined expansion ratio can satisfy the conditions of L/D= 0.3–10 wherein D is a maximum outer diameter in section of the foamed particle body and L is a maximum length in a direction perpendicular to the section of the body. When the foamed particles are in the form of, for example, cylinder, L and D correspond to the height and outer diameter of the cylinder, respectively. With respect to the individual foamed particles illustrated FIGS. 1A to 1C, the maximum height H corresponding to L and the maximum outer diameter D are shown in their drawings.

If the L'/D' and $d'_{MIN}/D'_{MIN}$ values of the resin particles respectively corresponding to the L/D and $d_{MIN}/D_{MIN}$ values of the foamed particles satisfy the conditions of L/D and $d_{MIN}/D_{MIN}$ as described above in the stage of the tubular resin particles, the foamed particles obtained by the expansion of the resin particles also generally satisfy these conditions irrespective of the expansion ratio because a difference of dimensional ratio scarcely arises between the $L'/D'$ and $d'_{MIN}/D'_{MIN}$ values prior to the expansion and the L/D and $d_{MIN}/D_{MIN}$ values after the expansion even when the overall dimension of the foamed particles is increased due to the expansion unless the foamed particles are specially stretched.

Examples of the blowing agent used upon the production of the foamed particles generally include volatile blowing agents such as propane, butane, isobutane, pentane, isopentane, hexane, cyclobutane, cyclopentane, cyclohexane, chlorofluoromethane, trifluoromethane, 1,1,1,2-tetrafluoroethane, 1-chloro-1,1-difluoroethane, 1,1-difluoroethane and 1-chloro-1,2,2,2-tetrafluoroethane, and inorganic gas blowing agents such as nitrogen, carbon dioxide, argon and air. Of these, inorganic gas blowing agents which causes no ozonosphere destruction and is cheap are preferable, with nitrogen, air and carbon dioxide being particularly preferred. Besides, two or more of the above-mentioned blowing agents may be used in combination. A mixed blowing agent of carbon dioxide and butane is preferred taking the effect of enhancing expansion ratio into consideration.

The amount of the blowing agents other than nitrogen and air to be used is generally 2–50 parts by weight per 100 parts by weight of the resin particles. On the other hand, nitrogen and air are generally introduced into a closed vessel under a pressure of 20–70 kgf/cm² G. The amount of the blowing agent to be used is suitably controlled according to the relationship between the bulk density of the foamed particles to be obtained and an foaming temperature.

No limitation is imposed on the dispersion medium used in dispersing the resin particles therein upon the production of the foamed particles so far as it does not dissolve the resin particles. Examples thereof include water, ethylene glycol, glycerol, methanol and ethanol. Water is generally used.

In the present invention, an anti-fusing agent may be used for the prevention of fusion bonding among the resin particles when the resin particles are dispersed in the dispersion medium to heat the resultant dispersion. Any anti-fusing agent may be used as such an anti-fusing agent, irrespective of inorganic and organic agents so far as it neither dissolves in water or the like nor melts upon the heating. However, inorganic anti-fusing agents are generally preferred.

Preferable examples of the inorganic anti-fusing agents include powders of kaolin, talc, mica, aluminum oxide, titanium oxide, aluminum hydroxide and the like. Besides, an anionic surfactant such as sodium dodecylbenzenesulfonate or sodium oleate may be optionally used as a dispersion aid. The average particle size of the anti-fusing agent is preferably 0.001–100 μm, particularly, 0.001–30 μm. In general, the amount of the anti-fusing agent to be added is preferably 0.01–10 parts by weight per 100 parts by weight of the resin particles. It is also preferable to add the surfactant as the dispersion aid in a proportion of generally 0.001–15 parts by weight per 100 parts by weight of the resin particles.

The molded article according to the present invention may be colored as necessary for the end application intended. For example, in the case where it is used in the formation of a water-permeable soil, a color pigment or dye such as a black, gray or brown pigment or dye may be added to the base resin. The molded article may also be optionally colored yellow, red, pink, green, blue or the like as necessary for the end application intended.

When an additive such as the color pigment or dye, or the inorganic substance is added to the base resin, the additive may be directly incorporated into the base resin. In general, it is however preferable to prepare a masterbatch containing a predetermined amount of the pigment or dye or the inorganic substance in consideration of the dispersibility of the pigment or dye or inorganic substance and then melt and knead this masterbatch with a resin excluding all the pigment or the dye or the inorganic substance. The amount of the color pigment or dye to be added may vary according to the kind and density of a color to be colored, and the like. However, it is preferably added in a proportion of 0.01–15 parts by weight per 100 parts by weight of the base resin in general. In order to enhance the expansion ratio of the resulting foamed particles and control the cell diameter thereof to 50–350 μm, an inorganic substance such as talc, calcium carbonate, borax or aluminum hydroxide may be added to the base resin. The amount of these inorganic substances to be added is preferably 0.001–5 parts by weight per 100 parts by weight of the base resin.

In order to produce the expansion-molded article according to the present invention, necessary conditions are to use the above-described foamed particles. An expansion-molded article having satisfactory voids and undergoing no shrinkage can be provided by suitably selecting conditions such as heating conditions and filling conditions.

Figure 3:
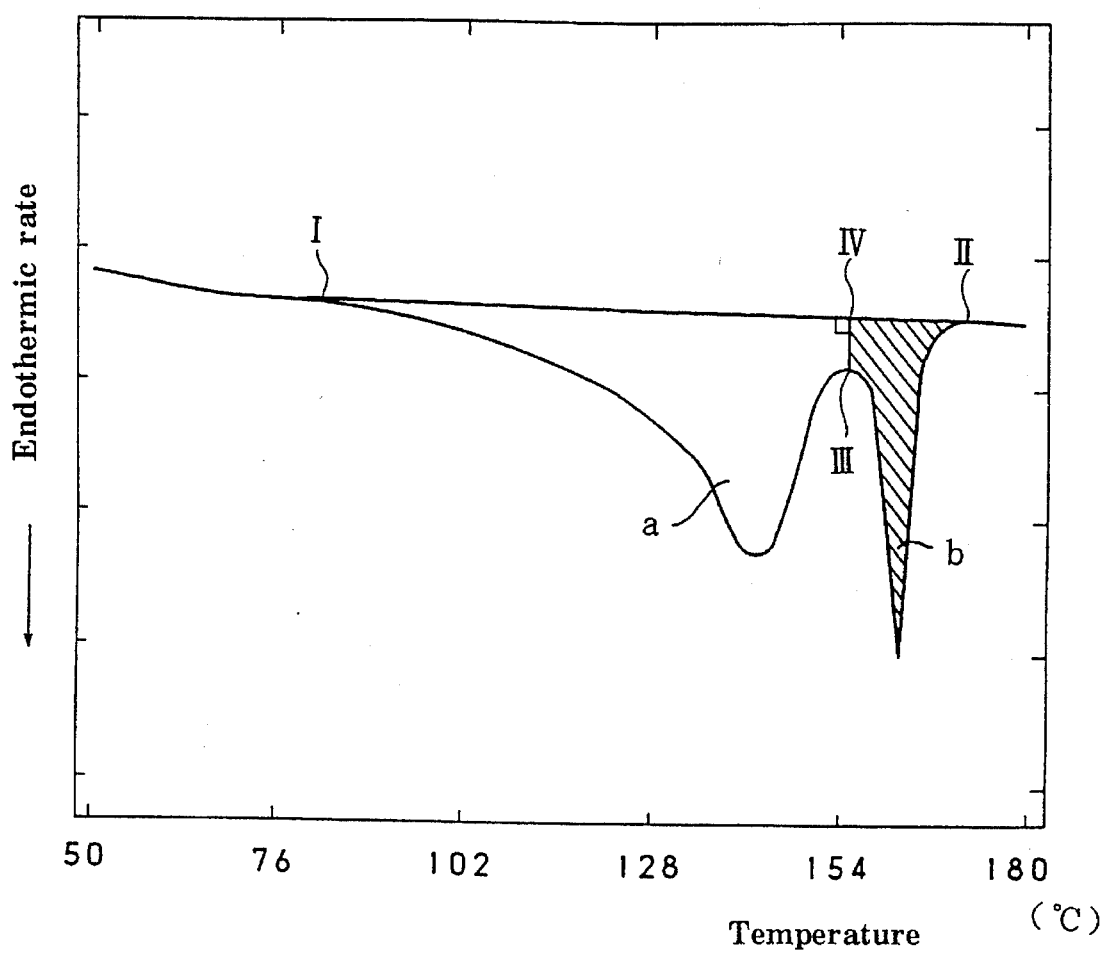
FIG. 3 shows an illustrative DSC curve of foamed particles of an ethylene-propylene random copolymer.
Figure 4:
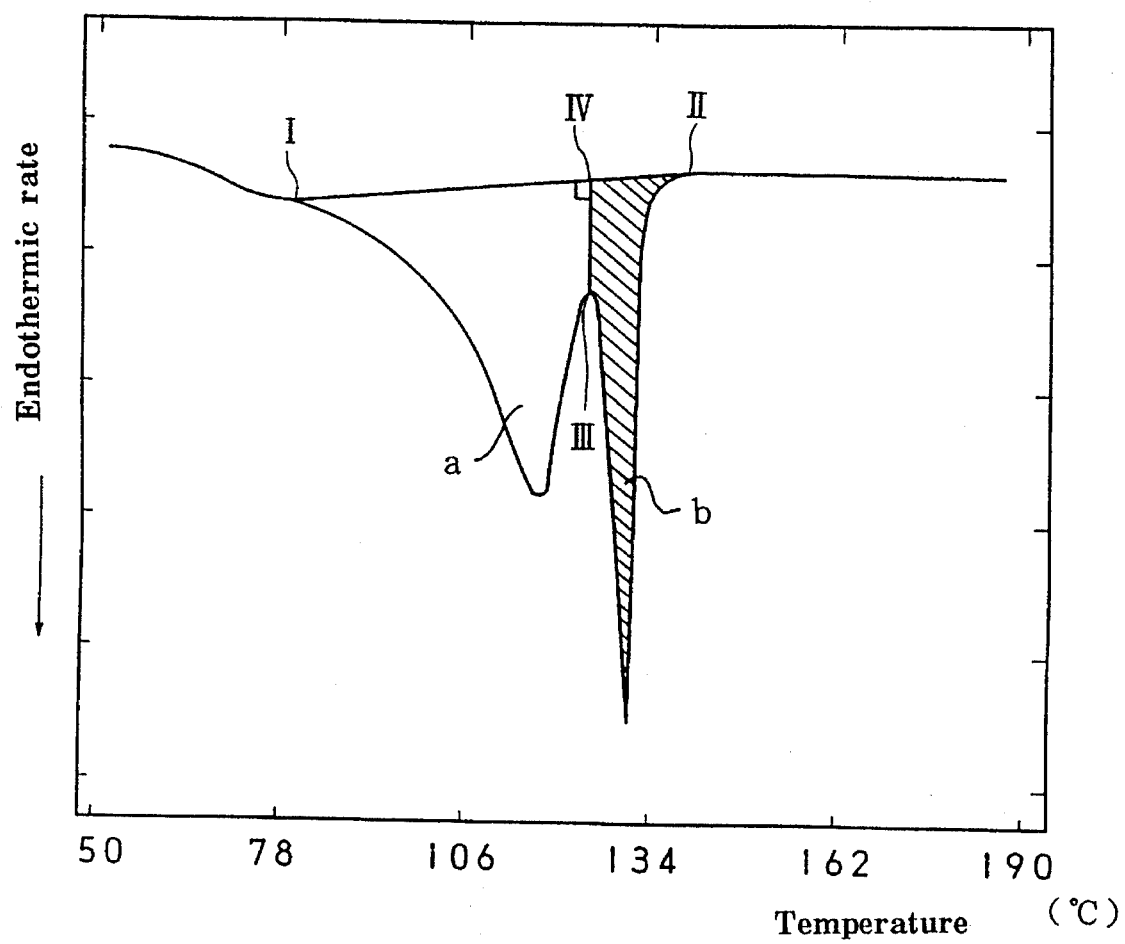
FIG. 4 shows an illustrative DSC curve of foamed particles of a linear low-density polyethylene.

As the foamed particles of the polyolefin resin used in the production of the molded article according to the present invention, it is further preferable to use foamed particles, on the DSC curve of which an endothermic peak (hereinafter referred to as the high-temperature peak b) on the temperature side higher than a temperature corresponding to an endothermic peak inherent to polyolefin resin (hereinafter referred to as the inherent peak a) appears as illustrated in FIGS. 3 and 4. The DSC curve is obtained by differential scanning calorimetry of the foamed particles and the endothermic peaks are attendant on the melting of the polyolefin resin. FIG. 3 shows a DSC curve of foamed particles of an ethylene-propylene random copolymer as a base resin, while FIG. 4 shows a DSC curve of foamed particles of a linear low-density polyethylene as a base resin. In the case of the foamed particles of the uncrosslinked polypropylene resin as illustrated in FIG. 3, the quantity of heat at the high-temperature peak b is preferably 13–30 J/g. On the other hand, in the case of the foamed particles of the uncrosslinked polyethylene resin as illustrated in FIG. 4, the quantity of heat at the high-temperature peak b is preferably 10–50 J/g. The use of such foamed particles permits the provision of a molded article slight in shrinkage and good in fusion bonding property among the foamed particles without need for any complicated pretreatment to pressurize the foamed particles prior to their molding under heat in a mold. If the quantity of heat at the high-temperature peak b on the DSC curve in the foamed particles of the polyolefin resin is lower than the lower limit of the range described above, the shrinkage of the resulting molded article can be prevented by charging the foamed particles into a pressure tank to increase their internal pressure before use. However, there is a possibility that the void content of the resulting molded article may become low due to their high secondary expandability.

The foamed particles may preferably be molded in such a manner that the void content X (%) of the foamed particles and the void content Y (%) of the resulting molded article satisfy the following inequality (1):

$$0.63 - \frac{30}{X} < \frac{Y}{X} < 0.63 \quad (1)$$

The void content X (%) of the foamed particles is determined in accordance with the following relationship by finding an apparent volume A (cm³) which is read by a graduated cylinder when placing the foamed particles in the graduated cylinder, and a true volume B (cm³) which is indicated by an increased volume when sinking the foamed particles into the graduated cylinder containing alcohol.

$X (\%) = [(A-B)/A] \times 100$

On the other hand, the void content Y (%) of the expansion-molded article is determined in accordance with the following relationship by calculating an apparent volume C (cm³) from the outside dimension of the molded article, and finding a true volume D (cm³) which is indicated by an increased volume when sinking the molded article into a graduated cylinder containing alcohol.

$Y (\%) = [(C-D)/C] \times 100$

Figure 5:
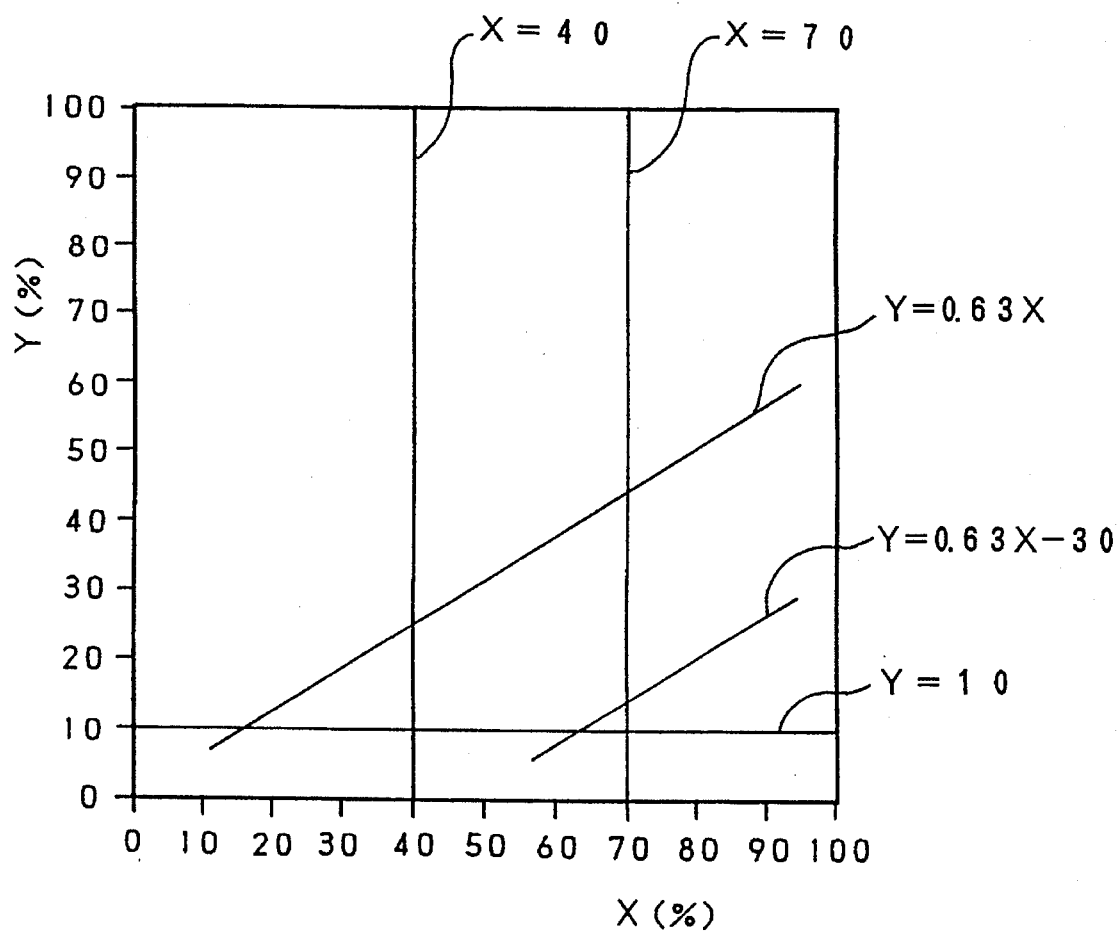
FIG. 5 is a graph illustrating the relationship between the void content Y of a molded article and the void content X of foamed particles.

The inequality (1) means that in FIG. 5, X and Y exist within a range below a straight line of Y=0.63X but above a straight line of Y=0.63X −30. In the case of Y>0.63X, namely, in the case where the intended Y is preset to at least 63% of X, molding must be conducted with the secondary expandability of the foamed particles suppressed. Therefore, the foamed particles must be brought into very close contact with one another in order to firmly fusion-bond the foamed particle to one another. However, this is difficult. As a result, the resulting molded article becomes a failure in fusion bonding. On the other hand, in the case of Y<0.63X−30, namely, in the case where the intended Y is extremely low compared with X, the foamed particles must be secondarily expanded to a great extent. Therefore, the resulting molded article undergoes marked shrinkage due to reduction in the internal pressure of the molded article and shortage of strength thereof, resulting in a failure to obtain a good molded article. Besides, X is preferably within a range of 40<X<70 because the productivity of the foamed particle becomes good. On the other hand, Y is preferably higher than 10 because a molded article having such a void content is practical from the viewpoint of water permeability and the like.

In the production of the expansion-molded article of the polyolefin resin according to the present invention, there is used a method in which the foamed particles are filled into a mold, which can be closed, but not sealed up, to heat them, thereby mutually fusion-bonding the foamed particles. No particular limitation is imposed on a heating medium introduced into the mold to heat the foamed particles. However, steam is generally used.

In the case where the tubular foamed particles described above are filled into the mold and molded under heat, thereby obtaining an expansion-molded article having open voids, heating conditions such as heating temperature and heating time are determined in due consideration of the shape of the foamed particles filled into the mold, the melting point of the base resin, the secondary expandability of the foamed particles, the shrinkage of the resulting molded article and the like. It is also possible to find a permissible range of the void content X from the graph shown in FIG. 5 according to the intended void content Y of the expansion-molded article, whereby foamed particles having a void content X within such a range are chosen for use.

Of important requirements for the selection of the heating conditions, the secondary expandability of the foamed particles and the shrinkage of the molded article have been proved to greatly depend upon the quantity of heat at the high-temperature peak of the foamed particles to be used. The use of foamed particles of the polyolefin resin, which have a quantity of heat at the high-temperature peak within the above-described range, makes it possible to apply a heating temperature range equal to or wider than a heating temperature range, in which a usual molded article having no open voids but possessing good physical properties can be obtained, to the production of the molded article according to the present invention. When the foamed particles whose quantity of heat at the high-temperature peak falls within the above range are used, a temperature ranging from (the melting point of the base resin of the foamed particles −15° C.) to (the melting point of the base resin of the foamed particles +10° C.) may be used as a temperature for heating the foamed particles in the mold. A molded article satisfying the object of the present invention can be easily obtained so long as the heating temperature falls within this range. The widening of the range of the molding temperature of the foamed particle is preferable because yield also becomes good. If the quantity of heat at the high-temperature peak is smaller than the lower limit defined in the present invention, the secondary expandability of the foamed particles becomes too high, and so there are possibilities that the voids in the resulting molded article may be filled and that the problem of shrinkage in the molded article may also arise.

If the quantity of heat at the high-temperature peak exceeds the upper limit of the above range, there is a possibility that the resulting molded article may undergo a failure of fusion bonding. In order to make the fusion bonding property better, it is therefore necessary to more elevate the heating temperature or to charge the foamed particles into a pressure tank so as to increase their internal pressure before use.

The quantity of heat at the high-temperature peak of the foamed particles is greatly affected by the heat history upon the production of the foamed particles. In order to achieve the quantity of heat at the high-temperature peak within the above range, it is effective, for example, to lower the rate, at which the resin particles are heated to the foaming temperature in the vessel, to 0.5° C./min or lower, or hold the resin particles in the vessel, in general, at a temperature not lower than (the melting point of the base resin −10° C.) but lower than a melting completion temperature for several minutes to several tens minutes, preferably 5–40 minutes, though such conditions vary according to the kind of the blowing agent, in the foaming process described above.

The quantity of heat at the high-temperature peak of the foamed particles and the melting point of the base resin of the foamed particles can be determined in accordance with the following procedure from DSC curves obtained by differential scanning calorimetry.

First of all, 2–8 mg of the foamed particles are heated to 220° C. at a heating rate of 10° C./min by a differential scanning calorimeter to obtain a first DSC curve. An inherent peak a and a high-temperature peak b appear on the first DSC curve. However, the high-temperature peak b may not appear in some cases due to a difference in the heat history upon the production of the foamed particles. The existence of the high-temperature peak b on the DSC curve can be determined by the following method. After the first DSC curve is obtained, the foamed particles are cooled from 220° C. to about 40° C. at a cooling rate of 10° C./min and are heated again to 220° C. at a heating rate of 10° C./min, thereby obtaining a second DSC curve (not shown). This second DSC curve is compared with the first DSC curve. An endothermic peak which appears on both first and second DSC curves is the inherent peak a. The high-temperature peak b does not appear on the second DSC curve. The high-temperature peak b and the inherent peak a of the foamed particles can be distinguished from each other by this fact. The temperatures corresponding respectively to the tops of the inherent peaks a, which separately appear on both first and second DSC curves, may differ a little in some instances. In the present invention, the temperature corresponding to the top of the inherent peak a determined by the second DSC curve is regarded as the melting point of the base resin of the foamed particles.

The quantity of heat at the high-temperature peak b, which has been ascertained by the comparison of the first DSC curve with the second DSC curve, is determined by the following procedure. As shown in FIG. 3 or 4, a straight line is first drawn between a point I at 80° C. on the DSC curve and a point II on the DSC curve, which indicates the melting completion temperature of the base resin. A perpendicular line is then drawn from a point III on the DSC curve, which corresponds to a valley between the inherent peak a and the high-temperature peak b, to the straight line connecting the point I and the point II. The intersection thereof is regarded as a point IV. The quantity of heat at the high temperature peak b is expressed by a section surrounded by a straight line connecting the point IV thus obtained and the point II, a straight line connecting the point III and the point IV, and a DSC curve connecting the point III and the point II, namely, an area hatched in FIG. 3 or 4. Incidentally, the quantity of heat at the high-temperature peak b of the foamed particles shows a value substantially equal to that of an expansion-molded article obtained by molding the foamed particles, which value is determined by measuring the molded article in the same manner.

Besides the above-described process, any other conventionally-known process such as a process in which a resin and a blowing agent are kneaded in an extruder, the mixture is extruded through a die having the desired sectional form so as to expand the resin, and the extruded foam is then cut into proper lengths may be used as a process for providing the foamed particles used in the present invention.

As the foamed particles useful in the practice of the present invention, those having an expansion ratio (bulk expansion ratio) of 5–120 times may be used. However, it is preferable to use those having a bulk expansion ratio of 5–30 times because they can provide a molded article having high compressive strength. In order to obtain foamed particles high in bulk expansion ratio, it is preferable to use the conventionally-known multi-stage foaming process in which the foamed particles obtained in the above-described manner are charged into a pressure tank to apply an internal pressure of at least 0.3 kg/cm$^2$ (G) to the interior of the foamed particles, and the thus-treated foamed particles are heated with steam or the like to expand them again. Upon heating and molding the foamed particles having a high bulk expansion ratio into a mold, it is preferable to increase the internal pressure of the foamed particle to at least 0.3 kg/cm$^2$ (G) prior to use in order to prevent the resulting expansion-molded article from undergoing shrinkage.

The molded article formed by heating the foamed particles in the mold to mutually fusion-bond the particles is cooled in the mold and then taken out of the mold. As a cooling method, there may be used any of a water-cooling method in which water is introduced into the mold to cool the molded article, a vacuum-cooling method in which the heat of vaporization of the steam or the like used in the heating is utilized, and an air-cooling method in which a cooling gas such as air is introduced into the mold to cool the molded article. However, the cooling by the vacuum-cooling method and/or the air-cooling method is preferred. In the case of the water-cooling method, water is filled in voids in the expansion-molded article, and so the molded article becomes heavy, which may possibly interfere with the removal of the molded article from the mold.

In the cooling of the molded article in the cooling step by the air-cooling method, an inert gas (hereinafter may be abbreviated as "gas" simply) pressurized to 0.5–10 kg/cm$^2$ (G) and kept at 70° C. or lower is used. More specifically, it is only necessary to introduce the gas from gas inlets provided in the mold into the mold and discharge the gas through gas outlets. As specific examples of cooling processes by the vacuum-cooling method and/or the air-cooling method, may be mentioned the following processes (1) to (4). These processes are described by reference to FIGS. 6 to 8.

Figure 6:
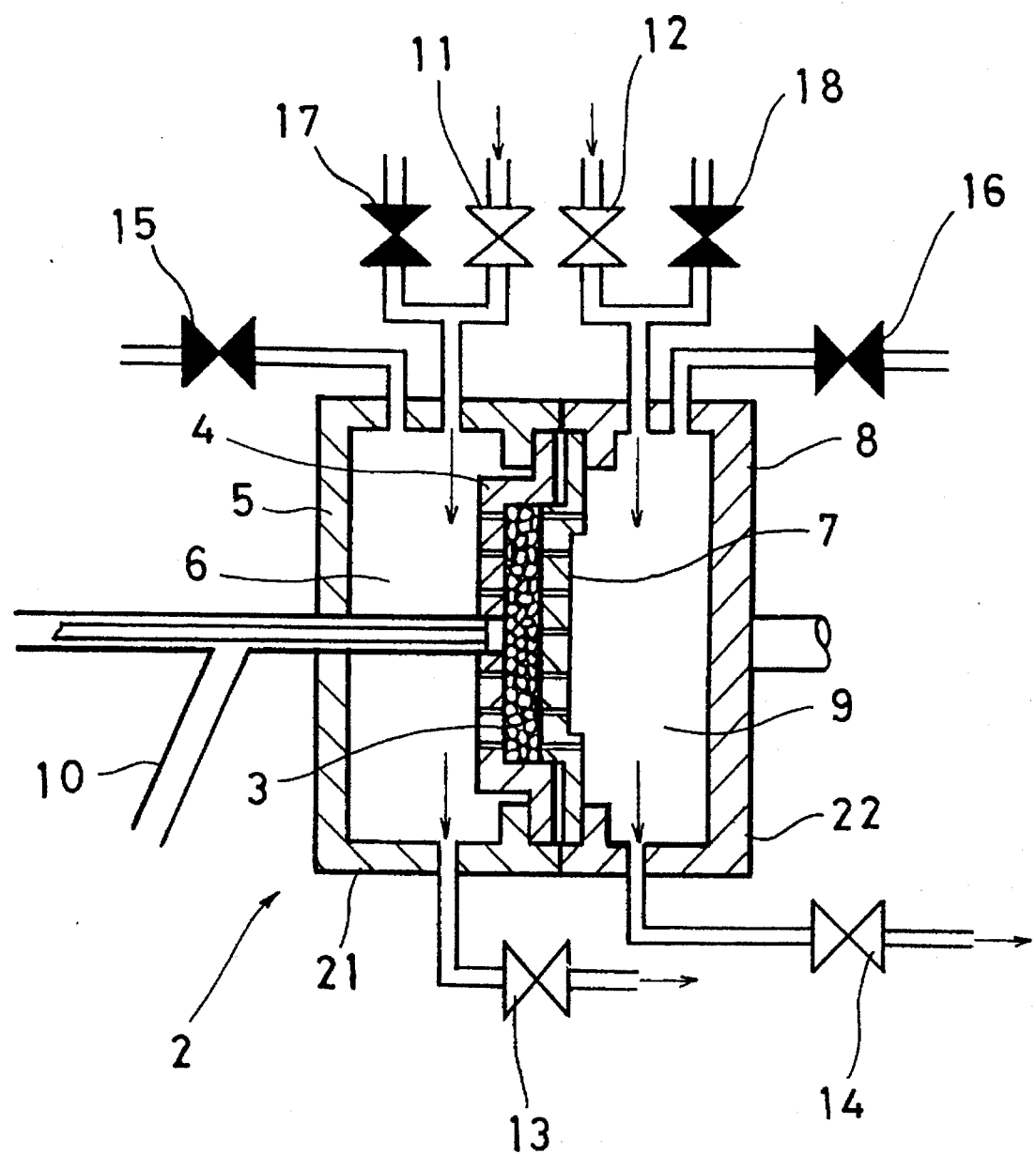
FIG. 6 is a schematic cross-sectional view of a mold for illustrating an open-close condition of valves of a pipe arrangement in the mold.
Figure 7:
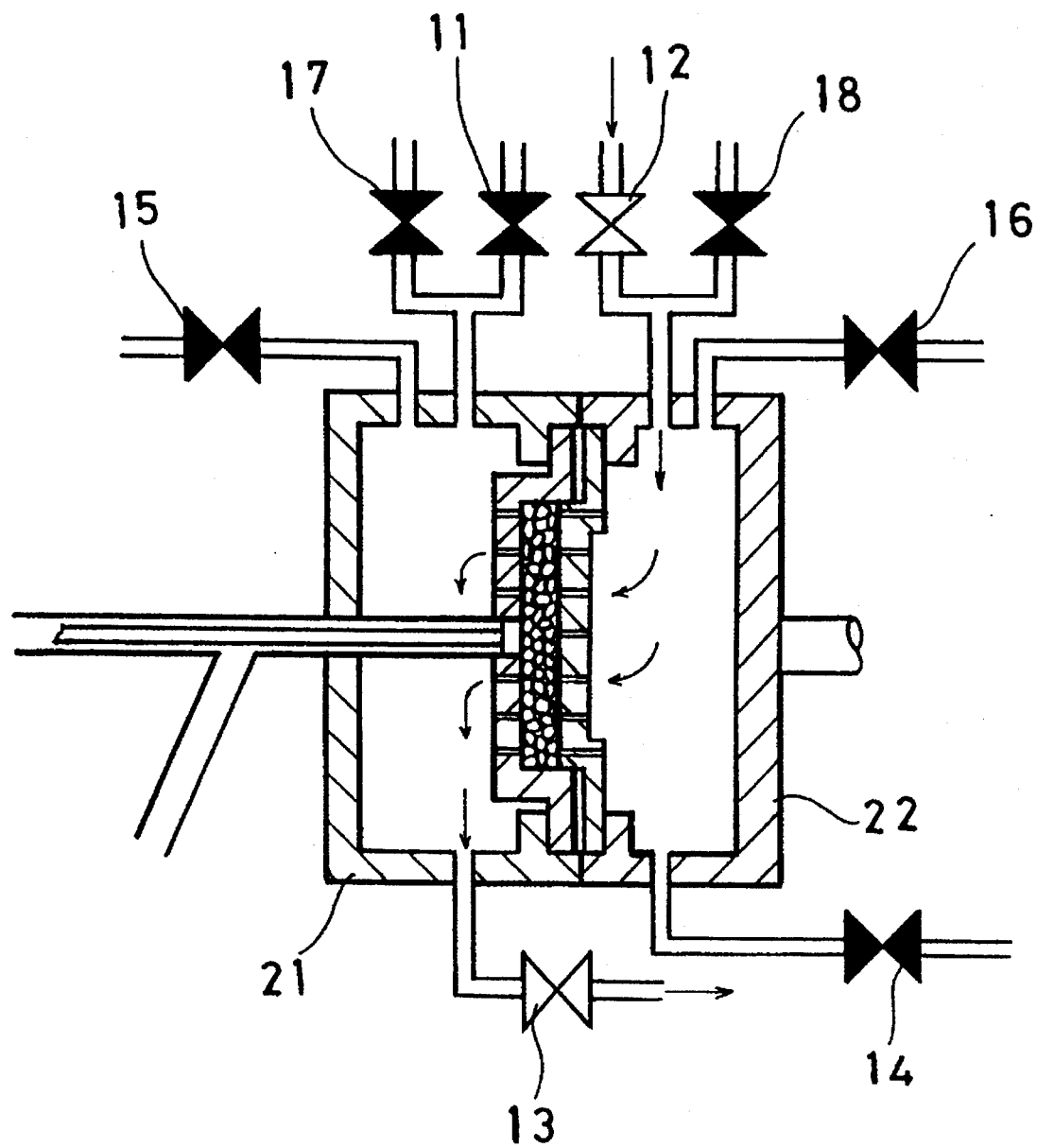
FIG. 7 is a schematic cross-sectional view of the mold for illustrating another open-close condition of the valves of the pipe arrangement in the mold.
Figure 8:
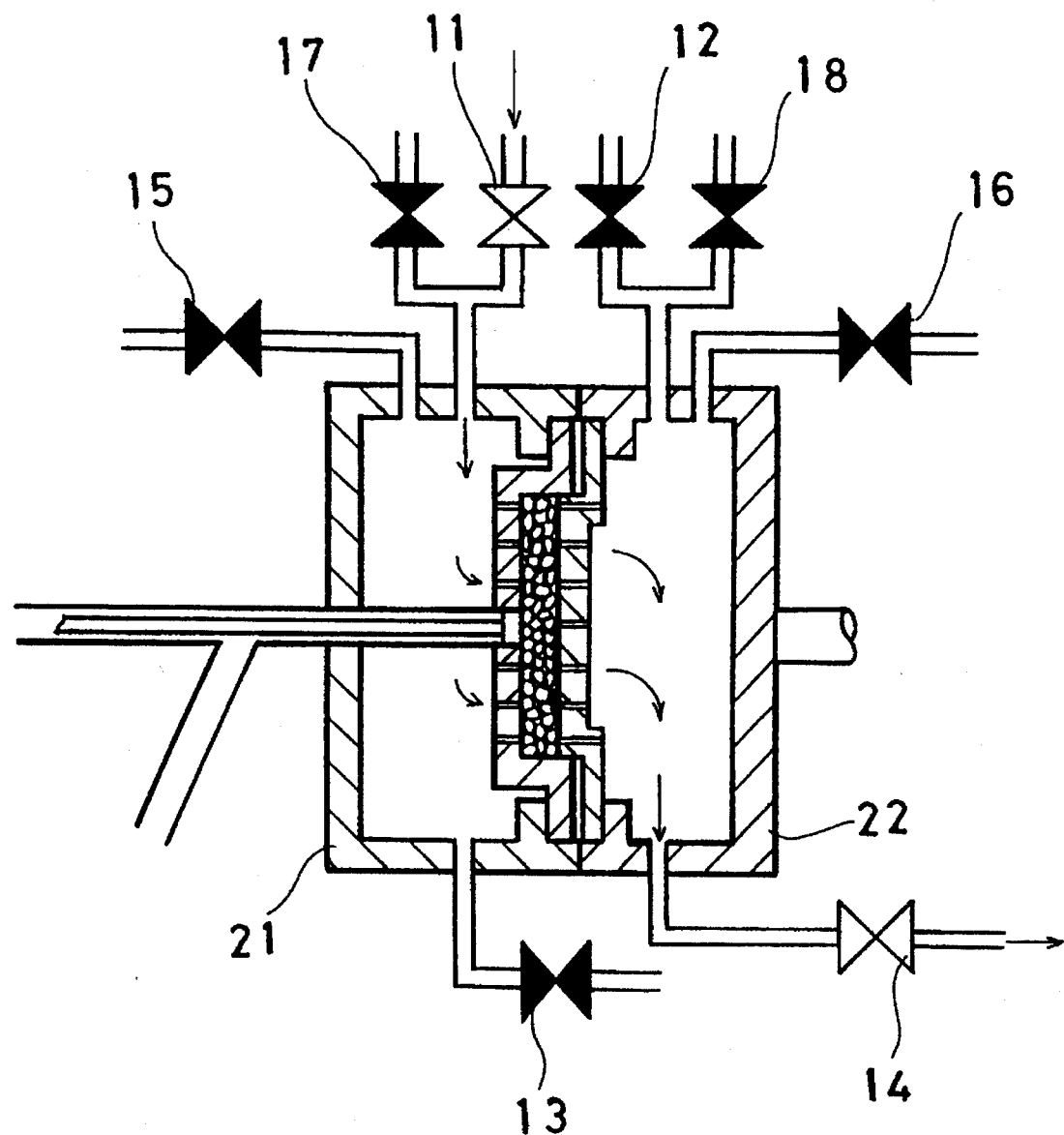
FIG. 8 is a schematic cross-sectional view of the mold for illustrating a further open-close condition of the valves of the pipe arrangement in the mold.

As illustrated in FIGS. 6 to 8, a mold 2 is constituted by, for example, a stationary mold 21 and a movable mold 22. The stationary mold 21 comprises a cavity-side inner mold 4 and a cavity-mold backing plate 5, and is provided with a gas inlet valve 11, a drain valve 13, a heating steam inlet valve 15 and a cooling water inlet valve 17 for introducing heating steam, cooling water, cooling gas or the like into a heating and cooling space 6 within the mold 21 or discharging drain out of the space 6. On the other hand, the movable mold 22 similarly comprises a core-side inner mold 7 and a core-mold backing plate 8, and is provided with a gas inlet valve 12, a drain valve 14, a heating steam inlet valve 16 and a cooling water inlet valve 18 for introducing heating steam, cooling water, cooling gas or the like into a heating and cooling space 9 within the mold 22 or discharging drain out of the space 9. The foamed particles 1 are introduced into a chamber 3 by a feeder 10, and heated with steam introduced through the heating steam inlet valves 15, 16 to mold them (since FIGS. 6 to 8 each illustrate a state that the molding under heat has been completed, the heating steam inlet valves 15 and 16 are closed at this time).

(1) In the case illustrated in FIG. 6, all the heating steam inlet valves 15, 16, the cooling water inlet valves 17, 18 are closed on both sides of the stationary mold 21 and the movable mold 22, while all the gas inlet valves 11, 12 and the drain valves 13, 14 are opened. In this state, a gas introduced into the space 6 through the gas inlet valve 11 is discharged on the outside through the drain valve 13 of the stationary mold 21 while cooling an expansion-molded article within the chamber 3. On the other hand, a gas introduced into the space 9 through the gas inlet valve 12 is discharged through the drain valve 14 of the movable mold 22 while cooling the expansion-molded article within the chamber 3.

(2) In the case illustrated in FIG. 7, the steam inlet valves 15, 16, the cooling water inlet valves 17, 18, the gas inlet valve 11 on the side of the stationary mold 21 and the drain valve 14 on the side of the movable mold 22 are closed, while the drain valve 13 on the side of the stationary mold 21 and the gas inlet valve 12 on the side of the movable mold 22 are opened. When a cooling gas is introduced through the gas inlet valve 12 in this state, the gas passes through voids in an expansion-molded article within the chamber 3 while cooling the molded article, and is discharged through the drain valve 13 on the side of the stationary mold 21.

(3) In the case illustrated in FIG. 8, in contrast with the case illustrated in FIG. 7, the gas inlet valve 11 on the side of the stationary mold 21 is open, and the drain valve 13 is closed, while the gas inlet valve 12 on the side of the movable mold 22 is closed, and the drain valve 14 is opened. A gas introduced through the gas inlet valve 11 on the side of the stationary mold 21 passes through voids in an expansion-molded article within the chamber 3 while cooling the molded article, and is discharged through the drain valve 14 on the side of the movable mold 22, which is a mold on the opposite side. As with the case illustrated in FIG. 7, in the case illustrated in FIG. 8, the gas introduced passes through voids in the expansion-molded article and is discharged through the drain valve of the mold on the opposite side.

(4) The methods described in the above (1) to (3) are combined.

A particularly preferable method of introducing a gas into the mold is a method in which a cooling gas is passed through voids in the expansion-molded article and discharged through the outlet of a mold on the side opposite to the mold in which the gas has been introduced as described in the above (2), (3) and (4). This method is excellent in the removing efficiency of water within the molded article. The open-close conditions of the valves in the above (1) to (3) are shown collectively in Table 1.

TABLE 1

| | Stationary mold | | Movable mold | | |
| --- | --- | --- | --- | --- | --- |
| | Gas inlet valve | Drain valve | Gas inlet valve | Drain valve | Remarks |
| (1) | Open | Open | Open | Open | Condition shown in FIG. 6 |
| (2) | Close | Open | Open | Close | Condition shown in FIG. 7 |
| (3) | Open | Close | Close | Open | Condition shown in FIG. 8 |

As the inert gas used in the cooling process described above, any gas may be used in addition to air so far as it is a chemically inert gas such as nitrogen, argon or carbon dioxide. However, air is most preferred from the viewpoint of economy. In the case where air is used as the inert gas, compressed air obtained by compressing by means of a compressor or the like is used. The inert gas to be introduced into the mold in the air-cooling cooling method is controlled to 70° C. or lower before use. If an inert gas having a temperature higher than 70° C. is used, it takes a long time to cool the molded article. It is more preferable to control the temperature of the gas to 40° C. or lower. The inert gas is also pressurized to 0.5–10 kg/cm$^2$ (G) before use. If an inert gas pressurized only below 0.5 kg/cm$^2$ (G) is used, it takes a long time to cool the molded article. In addition, an effect to blow off the water within the molded article becomes a little, and so the production efficiency is lowered. If an inert gas pressurized above 10 kg/cm$^2$ (G) is used, difficulties are encountered on the supply itself of such a high-pressure gas. The gas used in the cooling is preferably pressurized within a range of 0.5–6 kg/cm$^2$ (G). Any pressure within this range makes it possible to shorten the cooling time and to supply the gas with ease. It is still more preferable to use a dry inert gas of a temperature of 40° C. or lower because both drying efficiency and cooling efficiency of the molded article become good. The cooling time is preferably 10–180 seconds. Any time shorter than 10 seconds involves difficulties in performing sufficient cooling. On the other hand, any time exceeding 180 seconds makes the molding cycle longer, resulting in an increase in cost.

The molded article according to the present invention has open voids and is excellent in water permeability. However, when water is brought into contact with the molded article in a dry state for the first time, it may take a long time until the water penetrates, and there may come out pools in some cases. In order to solve such a problem, it is preferable to treat the molded article with a hydrophilicity-imparting agent in advance.

The hydrophilicity-imparting agent may be either contained in or coated on the molded article. However, the coating offers a problem in some degree from the viewpoint of lastingness of the effect of the hydrophilicity-imparting agent because there is a possibility that the agent may be washed out by passing water through the molded article and rubbed off by the surface friction of the molded article. On the other hand, in the case where the hydrophilicity-imparting agent is contained in the molded article, the hydrophilicity-imparting agent may bleed from the interior of the molded article into the surface thereof even if the hydrophilicity-imparting agent on the surface of the molded article is washed out or rubbed off by the passing of water or the friction. If the hydrophilicity-imparting agent exhibits no bleeding phenomenon on the contrary, there is no possibility that the agent may be washed out or rubbed off. When the hydrophilicity-imparting agent is contained in the molded article, the molded article further has many advantages including the fact that even when the molded article is cut and processed in situ, hydrophilicity on the cut surface can be ensured. Therefore, the hydrophilicity-imparting agent may preferably be contained in the molded article rather than coated thereon.

Examples of the hydrophilicity-imparting agent include silicon compounds such as dimethyl polysiloxane; water-soluble polymers such as sulfonated polystyrene and polyvinyl pyrrolidone; and hydrophilic liquid organic compounds such as ethylene glycol, glycerol and polyethylene glycol and surfactants.

Of these hydrophilicity-imparting agents, those obtained by crosslinking the water-soluble polymers to insolubilize them are preferred because they are excellent in lastingness and durability even when they are coated on the molded article, to say nothing of the case where they are contained in the molded article. Besides, the surfactants are preferred from the viewpoint of easy handling. On the other hand, when the hydrophilicity-imparting agent is contained in a base resin to obtain a molded article, the surfactants are most preferable for reasons of good compatibility with the base resin, lastingness, bleeding property and durability.

As the surfactants, there may be used anionic surfactants, cationic surfactants, nonionic surfactants and amphoteric surfactants. However, those exemplified below are mainly used.

Namely, as the anionic surfactants, there may be used olefin sulfates, salts of aliphatic alcohol sulfates such as sodium oleyl alcohol sulfate, salts of alkylsulfates, fatty acid ethylsulfonates, alkyisulfonates, alkylnaphthalenesulfonates, alkylbenzenesulfoantes and the like.

As the cationic surfactants, there may be used salts of primary amines, salts of tertiary amines, quaternary ammonium compounds, pyridine derivatives and the like. Further, other cationic surfactants include higher alkylamines such as N,N'-bis(hydroxyethyl)-N-alkylamines represented by the following general formula (a):

wherein R means an alkyl group having 12–18 carbon atoms.

As the nonionic surfactants, there may be used sorbitan monofatty acid esters represented by the following general formula (b), polyhydric alcohol fatty acid esters represented by the following general formula (c) and pentaerythritol fatty acid esters represented by the following general formula (d):

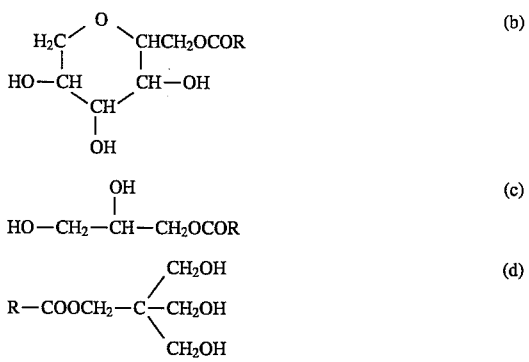

In the formula (b), R means an alkyl group having 12–18 carbon atoms. In the formulae (c) and (d), R denotes an alkyl group.

Specific examples of the polyhydric alcohol fatty acid esters include glyceryl monostearate, glyceryl distearate, glyceryl monooleate and glyceryl dioleate.

Further, other nonionic surfactants include carboxylic acid derivatives, imidazoline derivatives such as hydroxyethylimidazoline sulfate, adducts of fatty alcohols with ethylene oxide, adducts of fatty acids with ethylene oxide, adducts of fatty amines or fatty amides with ethylene oxide, adducts of alkylphenols with ethylene oxide, adducts of alkylnaphthols with ethylene oxide, adducts of polyhydric alcohol fatty acid esters with ethylene oxide, and polyethylene glycol.

The polyhydric alcohol fatty acid esters are preferred as the surfactants used as the hydrophilicity-imparting agent in the present invention, with those partially esterified being particularly preferred because they are considered to be capable of controlling the rate of bleeding. Even when the polyhydric alcohol fatty acid esters are contained in the foamed particles, they have no possibilities that fusion bonding among the foamed particles may be made insufficient upon molding, and the fusion-bonding strength among the particles in the resulting expansion-molded article may be impaired. On the contrary, they can impart hydrophilicity to the expansion-molded article.

The various surfactants described above may be used either singly or in any combination thereof. They may be combined with the hydrophilicity-imparting agents other than the surfactants. A higher alcohol may be used in combination with a view toward controlling the rate of bleeding and improving the lastingness of the hydrophilicity.

If the surfactants, hydrophilic liquid organic compounds and silicon compounds among the hydrophilicity-imparting agents are each contained in the molded article, such a hydrophilicity-imparting agent is preferably added in a proportion of 0.3–7 wt. % based on the whole expansion-molded article. If the proportion of the hydrophilicity-imparting agent to be added is lower than 0.3 wt. %, there is a possibility that sufficient hydrophilicity may not be imparted to the resulting molded article, and so the water permeability of the molded article when dried may not be improved. On the other hand, any proportion of the hydrophilicity-imparting agent exceeding 7 wt. % may possibly offer problems of fusion bonding property among the foamed particles, such as a failure of fusion bonding among the foamed particles, and moreover is uneconomical. In the present invention, the proportion of the hydrophilicity-imparting agent to be added is more preferably 1–3 wt. %.

When the hydrophilicity-imparting agent is a water-soluble polymer, such a hydrophilicity-imparting agent is preferably added in a proportion of 3–40 wt. % based on the whole expansion-molded article. If the proportion of the hydrophilicity-imparting agent of water-soluble polymer to be added is lower than 3 wt. %, sufficient hydrophilicity may not be imparted to the resulting molded article, and so the hydrophilicity of the molded article may not be satisfactorily improved. On the other hand, any proportion of the water-soluble polymer exceeding 40 wt. % encounters difficulties in providing excellent foamed particles in the process of producing foamed particles from resin particles if such a great amount of the water-soluble polymer is contained in the resin particles.

The expansion-molded article containing the hydrophilicity-imparting agent can be obtained by incorporating the hydrophilicity-imparting agent into the tubular resin particles as the starting material used in the production of the foamed particles in advance. As a process of incorporating the hydrophilicity-imparting agent into the resin particles, there may also be used a process in which the hydrophilicity-imparting agent is directly added to a raw base resin melted in an extruder to knead the mixture. However, it is generally preferable to use a masterbatching process taking the dispersibility of the hydrophilicity-imparting agent in the resin and the like into consideration.

When the hydrophilicity-imparting agent is contained in the resin, the contact angle of the resin with water varies. In general, the contact angle becomes narrower as the content of the hydrophilicity-imparting agent increases. It is preferable to control the contact angle to narrower than 96 degrees, particularly narrower than 87 degrees by adjusting the content of the hydrophilicity-imparting agent making good use of this fact. The use of a resin whose contact angle has been controlled to such a value results in an expansion-molded article markedly superior in water permeability to an expansion-molded article containing no hydrophilicity-imparting agent and an expansion-molded article composed of a base resin whose contact angle is at least 96 degrees.

In the measurement of the contact angle, a base resin containing the hydrophilicity-imparting agent, or an expansion-molded article thereof is held between planar aluminum plates corresponding to the symbol A1080P described in JIS H 4000 and heat-pressed at 200° C. into a sheet. The measured value on the thus-formed sheet is taken as the contact angle. The contact angle is determined on the basis of the following formula in accordance with the liquid drop method (volume of droplet: about 3 mm$^3$) making use of a CA-S Micro 2 Model manufactured by Kyowa Kaimenkagaku K. K. by using sheet of the base resin obtained by the method described above as a sample.

$$\theta/2 = \tan^{-1} (h/r)$$

wherein θ is a contact angle, h is a height of a water droplet, and r is a radius of the water droplet.

In the above method, ultrapurified water is used as water for the measurement. Incidentally, both sheet of a base resin containing the hydrophilicity-imparting agent and expansion-molded article of such a resin, which has been defoamed by heat pressing, have the same value as to the contact angle.

On the other hand, the molded article coated with the hydrophilicity-imparting agent is obtained by molding foamed particles coated with the hydrophilicity-imparting agent or molding foamed particles and then coating the surface of the resulting molded article with the hydrophilicity-imparting agent. In each case, the hydrophilicity-imparting agent is preferably used as a solution in a concentration of 0.01–0.5 wt. %.

The water permeability-improving effect of the hydrophilicity-imparting agent is particularly marked in the case where the void contents of the resulting expansion-molded article is as relatively low as 5–30%, or the average maximum diameter of voids at a horizontal surface of the expansion-molded article is as relatively small as 1–4 mm.

The molded articles according to the present invention are suitable for use as underlay materials for riding grounds and bridle paths in a riding club and artificial lawn in roof gardens, drainage equipment such as covered conduits, drainage-accelerating materials for golf links, lightweight banking materials typified by blocks for the EPS method, and the like making best use of their good water permeability.

The riding ground and bridle path are constructed, for example, by laying the molded article according to the present invention, which has been formed to a thickness of 30–60 mm, on the surface of a concrete foundation in which drain ditches have been dug, and spreading sand or rubber chips to a thickness of 30–100 mm over the molded article. In this case; it is preferable to color the molded article gray similar to the color of the sand or rubber chips because the exposure of the surface of the molded article due to slide of the sand or the like spread over the surface of the molded article does not cause horses much surprise. The coloring is generally performed, for example, by incorporating carbon black or the like in the stage that the tubular resin particles are formed.

In the case where the molded article according to the present invention is used as the underlay material for artificial lawn in a roof garden, there is used a method in which the molded article of the present invention, which has been formed to a thickness of 10–30 mm, is laid on a concrete foundation in which drain ditches have been optionally dug, and the artificial lawn is laid thereon. Rain water or the like is easily drained through the molded article from the artificial lawn, and so the artificial lawn is quickly dried.

In order to construct the covered conduit, there is used a method in which a perforated drainage pipe is surrounded by the molded article of the present invention, and then covered with sand, gravel and/or soil. In the case where the molded article is used as a drainage-accelerating material for a golf links, there is a method in which the molded article according to the present invention is directly laid on the ground, and soil, sand and lawn are laid thereon in order.

Since expanded polystyrene blocks poor in water permeability are generally used as a banking material, such a banking material is poor in draining ability, and so there is a possibility that when the fill-up ground is submerged in a great amount of water, the blocks may be lifted up and moved by buoyancy of water collected about the blocks. Therefore, it has heretofore been necessary to cover the blocks with a wedge or a wire gauze. When the molded article according to the present invention is used as a banking material, such a problem can be solved because the molded article is good in draining ability.

The present invention will hereinafter be described in further detail by the following examples.

EXAMPLES 1–11 AND COMPARATIVE EXAMPLES 1–4

Their corresponding base resins shown in Table 2, carbon black as a pigment and aluminum hydroxide as an inorganic substance were melted and kneaded in an extruder, and each of the thus-melted mixtures was then extruded into a strand through a die in the form substantially similar to its corresponding sectional form shown-in Table 2. The strand was quenched in water, and chopped into predetermined lengths, thereby forming pellets. Incidentally, in the column of "Sectional form" of Table 2, the mark (a) and (i) mean that the sectional forms of the resulting foamed particles correspond to the sectional forms of the particles illustrated in FIGS. 2A and 2I, respectively, while the mark (+) means that the sectional form of the resulting foamed particles is a cross in all sections perpendicular to the direction of the height H.

A closed vessel (internal volume: 400 l) was then charged with, per 100 kg of the thus-obtained pellets, 2.5–6 kg of carbon oxide as a blowing agent, 400 g of kaolin as a dispersing agent, 4 g of sodium dodecylbenzenesulfonate as a dispersion aid and 220 l of water. The contents were heated to a foaming temperature of 150–155° C. with stirring without raising the temperature of the mixture beyond a melting completion temperature of the base resin and held for 10–15 minutes at the same temperature. While feeding carbon dioxide to apply a back pressure equal to the equilibrium vapor pressure within the closed vessel, the vessel was then opened at one end thereof to release the resin particles and water at the same time, thereby expanding the resin particles at a predetermined expansion ratio. Incidentally, aluminum hydroxide and carbon black were added by the masterbatching process to give compounding amounts of 0.2 wt. % and 0.27 wt. % based on the whole resin particles, respectively. Properties of the thus-obtained foamed particles are shown collectively in Table 2.

The thus-obtained foamed particle samples were each filled into a flat mold of 30 cm×30 cm×6 cm, and heated with steam under its corresponding conditions shown in Tables 2 to mold the foamed particles, thereby obtaining a molded article in a form conforming with the mold dimensions. In Example 6, an internal pressure of 1.5 kgf/cm²G was applied to the foamed particles upon their molding. In other examples, molding was performed without applying any treatment for the application of an internal pressure. The resulting molded articles were cooled under their corresponding conditions shown in Table 2. In the column of "Air-cooling" of Table 2, (1), (2) and (3) respectively indicate the open-close conditions of valves shown in (1), (2) and (3) of Table 1. Various properties of the thus-obtained molded articles are given collectively in Table 2.

The bulk density $\rho_1$ (g/cm³) of the foamed particles or molded article in each example is a value determined by placing the foamed particles or molded article of known weight $M_1$ (g) in a graduated cylinder and dividing the weight $M_1$ by a volume $D_1$ (cm³) read by the graduated cylinder at this time ($M_1/D_1$).

The true density $\rho_2$ (g/cm³) of the foamed particles is a value determined by placing the foamed particles of known weight $M_2$ (g) in a graduated cylinder containing alcohol and dividing the weight $M_2$ by a volume $D_2$ (cm³) corresponding to an increased volume read by the graduated cylinder when sinking the foamed particles into the graduated cylinder containing alcohol ($M_2/D_2$). The true expansion ratio of the foamed particles is a values determined by dividing a density $\rho$ (g/cm³) of the base resin by the true density $\rho_2$ of the foamed particles ($\rho/\rho_2$), while the bulk expansion ratio of the foamed particles is a value determined by dividing a density $\rho$ (g/cm³) of the base resin by the bulk density $\rho_1$ of the foamed particles ($\rho/\rho_1$)

The bulk expansion ratio of the expansion-molded article is a value determined by calculating an apparent volume B' from the outside dimension of the molded article, measuring the weight W (g) of the expansion-molded article and dividing a product of the apparent volume B' (cm³) and the density $\rho$ (g/cm³) of the base resin by the weight W (B'$\rho$/W).

The filling factor of the foamed particles is a value in terms of percentage determined by dividing a true volume (cm³) of the foamed particles filled into a mold by an internal volume (cm³) of the mold.

The fusion bonding property among the foamed particles in the molded article was evaluated by stretching each of 5 specimens of 5 cm×10 cm×5 mm, which had been cut out of the molded article, in a longitudinal direction to break it and observing its rupture cross-section to rank it in accordance with the following standard:

A: Non-interparticle breakage occurred on all the specimens;
B: Non-interparticle breakage mainly occurred on all the specimens, but interparticle breakage somewhat occurred;
C: Non-interparticle breakage was observed on a part of the specimens, but interparticle breakage mainly occurred; and
D: Interparticle breakage occurred on all the specimens.

The coefficient of water permeability was determined in accordance with the equation of constant water level prescribed in JIS A 1218 by using each expansion-molded article as a sample in place of sand, and a rectangular tube in place of a cylinder in which the sample was placed.

The shrinkage factor was determined in accordance with the following formula:

$$\text{Shrinkage factor (\%)} = (H'-h)/H' \times 100$$

wherein h is a minimum thickness of an expansion-molded article, and H' is a thickness of a cavity of its corresponding mold. Incidentally, if the expansion-molded article has another shape than the form of a flat plate, the shrinkage factors of the expansion-molded article were determined from different angles, and a maximum value thereof is taken as the shrinkage factor of the expansion-molded article.

EXAMPLES 12–16

Their corresponding base resins shown in Table 3, 0.27 wt. % of carbon black as a pigment, 0.2 wt. % of aluminum hydroxide as an inorganic substance and their corresponding surfactants shown in Table 3 as a hydrophilicity-imparting agent were melted and kneaded in an extruder, and each of the thus-melted mixtures was then extruded into a strand through a die. The strand was quenched in water, and chopped into predetermined lengths, thereby obtaining tubular resin particles as illustrated in FIG. 2A. A closed vessel (internal volume: 5 l) was charged with 1 kg of the thus-obtained particles, 40 g of carbon dioxide as a blowing agent, 4 g of kaolin as a dispersing agent, 0.03 g of sodium dodecylbenzenesulfonate as a dispersion aid and 3 l of water as a dispersion medium. The contents were heated to a foaming temperature of 152.5° C. with stirring without raising the temperature of the mixture beyond a melting completion temperature of the base resin and held for 15 minutes at the same temperature. While feeding carbon dioxide to apply a back pressure equal to the equilibrium vapor pressure within the closed vessel, the vessel was then opened at one end thereof to release the resin particles and water at the same time, thereby expanding the resin particles. Properties of the thus-obtained foamed particles are shown collectively in Table 3.

Incidentally, aluminum hydroxide, carbon black and the surfactant were added by the masterbatching process to give compounding amounts of 0.2 wt. %, 0.27 wt. % and its corresponding amount shown in Table 3 based on the whole resin particles, respectively.

The thus-obtained foamed particle samples were each molded by means of a flat mold of 30 cm×30 cm×6 cm without applying any treatment for the application of an internal pressure, thereby obtaining a molded article in a form conforming with the mold dimensions. The foamed particle sample filled in the mold was heated with steam of its corresponding molding temperature shown in Table 3 to mold it. The resulting molded articles were cooled under their corresponding conditions shown in Table 3. The measurement results as to the fusion bonding property among the foamed particles and water permeability of the molded articles, and their bulk densities and void contents are shown in Table 3 as with the results in Examples 1–11.

TABLE 2

| | | Hydrophilicity-imparting agent | | Contact angle resin sheet with water (°) | Foamed particle | | | | | | | | |
|---|---|---|---|---|---|---|---|---|---|---|---|---|---|
| | Kind of base resin | Kind | Amount added (wt. %) | | Sectional form | $d_{MIN}$ (mm) | $D_{MIN}$ (mm) | $d_{MIN}/D_{MIN}$ | H (mm) | Quantity of heat at high-temp. peak (J/g) | True expn. ratio (times) | Bulk expn. ratio (times) | Void content X (%) |
| Ex. 1 | Ethylene-*1 propylene copolymer | Not added | — | 101 | (a) | 2.2 | 4.2 | 0.52 | 6.6 | 20.1 | 9.2 | 21.4 | 57.1 |
| Ex. 2 | Ethylene-*1 propylene copolymer | Not added | — | 101 | (a) | 1.7 | 6.6 | 0.26 | 6.3 | 17.2 | 10.2 | 18.4 | 44.5 |
| Ex. 3 | Ethylene-*1 propylene copolymer | Not added | — | 101 | (a) | 2.6 | 5.4 | 0.48 | 3.7 | 23.7 | 9.8 | 22.0 | 55.4 |
| Ex. 4 | Ethylene-*1 propylene copolymer | Not added | — | 101 | (a) | 3.8 | 6.3 | 0.60 | 2.7 | 16.5 | 11.4 | 30.5 | 62.6 |
| Ex. 5 | Ethylene-*1 propylene copolymer | Not added | — | 101 | (a) | 1.7 | 4.1 | 0.41 | 2.0 | 14.2 | 6.0 | 12.4 | 51.6 |
| Ex. 6 | Ethylene-*1 propylene copolymer | Not added | — | 101 | (i) | 2.8 | 4.9 | 0.57 | 5.0 | 12.8 | 10.8 | 26.7 | 49.6 |
| Ex. 7 | Ethylene-*1 propylene copolymer | Not added | — | 101 | (a) | 1.5 | 5.1 | 0.29 | 4.9 | 16.1 | 11.7 | 23.2 | 43.5 |
| Ex. 8 | Ethylene-*1 propylene copolymer | Not added | — | 101 | (a) | 1.7 | 6.6 | 0.26 | 6.3 | 17.2 | 10.2 | 18.4 | 44.5 |
| Ex. 9 | Ethylene-*1 propylene copolymer | Not added | — | 101 | (a) | 1.7 | 6.6 | 0.26 | 6.3 | 17.2 | 10.2 | 18.4 | 44.5 |
| Ex. 10 | Ethylene-*1 propylene copolymer | Not added | — | 101 | (a) | 1.7 | 6.6 | 0.26 | 6.3 | 17.2 | 10.2 | 18.4 | 44.5 |
| Ex. 11 | Ethylene-*1 propylene copolymer | Not added | — | 101 | (a) | 1.7 | 6.6 | 0.26 | 6.3 | 17.2 | 10.2 | 18.4 | 44.5 |
| Comp. Ex. 1 | Ethylene-*1 propylene copolymer | Not added | — | 101 | (a) | 1.1 | 4.1 | 0.27 | 2.1 | 14.6 | 7.5 | 10.5 | 38.6 |
| Comp. Ex. 2 | Ethylene-*1 propylene copolymer | Not added | — | 101 | (a) | 2.3 | 10.3 | 0.22 | 8.5 | 18.1 | 10.3 | 16.5 | 37.6 |
| Comp. Ex. 3 | Ethylene-*1 propylene copolymer | Not added | — | 101 | (a) | 2.8 | 5.1 | 0.90 | 5.3 | 14.2 | 12.6 | 28.2 | 55.3 |
| Comp. Ex. 4 | Ethylene-*1 propylene copolymer | Not added | — | 101 | (+) | — | 6.6 | — | 6.8 | 27.4 | 8.3 | 23.8 | 65.1 |

| | Molding conditions | | | | | Properties of molded article | | | | | |
|---|---|---|---|---|---|---|---|---|---|---|---|
| | Molding temp. (°C.) | Filling factor (%) | Air-cooling (sec) | | | Water-cooling (sec) | Void content Y (%) | Bulk expn. ratio (times) | Fusion-bonding property among particles | Coefficient of water permeability x $10^{-2}$ (cm/sec) | Shrinkage factor (%) | Remarks |
| | | | (1) | (2) | (3) | | | | | | | |
| Ex. 1 | 141 | 46.7 | — | — | — | 30 | 24.4 | 19.1 | A | 10.1 | 1.8 | |
| Ex. 2 | 141 | 60.1 | — | — | — | 30 | 22.6 | 17.8 | A | 9.2 | 2.0 | |
| Ex. 3 | 151 | 48.2 | — | — | — | 30 | 20.3 | 21.5 | A | 4.4 | 1.4 | |
| Ex. 4 | 135 | 40.4 | — | — | — | 30 | 36.1 | 28.9 | A | 24.6 | 3.5 | *2 |
| Ex. 5 | 151 | 52.4 | — | — | — | 30 | 29.6 | 12.2 | A | 22.1 | 1.4 | |
| Ex. 6 | 135 | 54.6 | — | — | — | 30 | 19.0 | 25.4 | A | 4.1 | 0.4 | *3 |
| Ex. 7 | 141 | 61.3 | — | — | — | 30 | 14.6 | 21.8 | A | 4.0 | 2.1 | |
| Ex. 8 | 141 | 60.1 | 60 | — | — | — | 22.4 | 17.5 | A | 9.2 | 2.0 | |
| Ex. 9 | 141 | 59.9 | — | 30 | — | — | 22.1 | 17.1 | A | 9.2 | 2.1 | |
| Ex. 10 | 141 | 60.4 | — | — | 30 | — | 21.9 | 17.2 | A | 9.2 | 2.1 | |
| Ex. 11 | 141 | 61.1 | 15 | — | — | — | 22.3 | 17.6 | A | 9.2 | 2.2 | *4 |
| Comp. Ex. 1 | 151 | 66.7 | — | — | — | 30 | 5.0 | 9.7 | A | 1.1 | 0.5 | |
| Comp. | 151 | 67.2 | — | — | — | 30 | 12.6 | 15.9 | A | 2.6 | 1.5 | |

TABLE 2-continued

| | | | | | | | | | | | | |
|---|---|---|---|---|---|---|---|---|---|---|---|---|
| Ex. 2 | | | | | | | | | | | | |
| Comp. Ex. 3 | 141 | 48.4 | — | — | — | 30 | — | — | A | — | 21.3 | |
| Comp. Ex. 4 | 128 | 37.8 | — | — | — | 30 | 39.6 | 21.0 | D | 25.7 | 1.0 | *2 |

*1: Ethylene-propylene random copolymer (MI: 10 g/10 min; ethylene content: 2.4 wt. %; melting point: 147° C.; melting completion temperature: 164° C.)
*2: The 5% compressive strength determined in accordance with JIS Z 0234 was lower than 1.1 kg/cm² (others were at least 1.1 kg/cm²).
*3: The internal pressure of the foamed particles was 1.5 kgf/cm²G.
*4: Vacuum suction was conducted prior to air-cooling.

TABLE 3

| | Kind of base resin | Hydrophilicity-imparting agent Kind | Amount added (wt. %) | Contact angle resin sheet with water (°) | Sectional form | $d_{MIN}$ (mm) | $D_{MIN}$ (mm) | $d_{MIN}/D_{MIN}$ | H (mm) | Quantity of heat at high-temp. peak (J/g) | True expn. ratio (times) | Bulk expn. ratio (times) | Void content X (%) |
|---|---|---|---|---|---|---|---|---|---|---|---|---|---|
| Ex. 12 | Ethylene-*1 propylene copolymer | Glyceryl monostearate | 1 | 95 | (a) | 1.5 | 5.0 | 0.30 | 5.0 | 18.5 | 12.0 | 24.8 | 43.5 |
| Ex. 13 | Ethylene-*1 propylene copolymer | Glyceryl monostearate | 2 | 86 | (a) | 1.6 | 5.1 | 0.31 | 5.1 | 16.7 | 11.8 | 23.6 | 41.5 |
| Ex. 14 | Ethylene-*1 propylene copolymer | Glyceryl monostearate | 5 | 77 | (a) | | 5.2 | 0.31 | 4.9 | 16.5 | 12.1 | 24.5 | 42.4 |
| Ex. 15 | Ethylene-*1 propylene copolymer | Glyceryl monostearate | 10 | 54 | (a) | 1.5 | 4.9 | 0.31 | 5.1 | 17.4 | 12.2 | 23.4 | 43.3 |
| Ex. 16 | Ethylene-*1 propylene copolymer | Glyceryl monostearate | 0.2 | 98 | (a) | 1.6 | 5.0 | 0.32 | 5.0 | 17.6 | 11.7 | 24.6 | 44.3 |

| | Molding conditions | | | | | | Properties of molded article | | | | | |
|---|---|---|---|---|---|---|---|---|---|---|---|---|
| | Molding temp. (°C.) | Filling factor (%) | Air-cooling (sec) (1) | (2) | (3) | Water-cooling (sec) | Void content Y (%) | Bulk expn. ratio (times) | Fusion-bonding property among particles | Coefficient of water permeability × $10^{-2}$ (cm/sec) | Shrinkage factor (%) | Remarks |
| Ex. 12 | 141 | 61.9 | — | — | — | 30 | 15.1 | 22.2 | A | 4.1 | 2.1 | |
| Ex. 13 | 141 | 63.2 | — | — | — | 30 | 14.4 | 22.0 | A | 4.1 | 2.1 | |
| Ex. 14 | 141 | 62.0 | — | — | — | 30 | 18.9 | 22.8 | B | 4.2 | 2.0 | |
| Ex. 15 | 141 | 61.1 | — | — | — | 30 | 22.2 | 21.7 | C | 4.4 | 1.8 | |
| Ex. 16 | 141 | 60.7 | — | — | — | 30 | 16.6 | 22.0 | A | 4.1 | 2.1 | |

*1: Ethylene-propylene random copolymer (MI: 10 g/10 min; ethylene content: 2.4 wt. %; melting point: 147° C.; melting completion temperature: 164° C.).

As described above, the expansion-molded articles of the polyolefin resin according to the present invention are formed by mutually fusion-bonding specific tubular foamed particles. Therefore, they are sufficiently high in fusion-bonding strength among the foamed particles and have open voids at high void content, and hence exhibit excellent water permeability and compressive strength. Those having a coefficient of water permeability of at least $4.0 \times 10^{-2}$ (cm/sec) are suitable for use in subdrainage equipment and the like of which excellent durability under load and water permeability are required.

Those having compressive strength not lower than 1.1 kg/cm² when compressed by 5% exhibit excellent durability and sound absorbing quality even when used not only in the subdrainage equipment and the like, but also as building materials and civil engineering materials.

Those molded from the foamed particles containing the hydrophilicity-imparting agent therein or coated with the agent exhibit excellent water permeability even when water is caused to pass through or brought into contact with the molded articles in a dry state.

According to the production process of the present invention, the excellent molded articles as described above can be produced with ease. When the foamed particles whose quantity of heat at the high-temperature peak on the DSC curve falls within a specific range are used in the molding, the expansion-molded articles having open voids and excellent water permeability can be easily obtained without need for any complicated operation such as control of heating temperature or internal pressure of the foamed particles upon their molding under heat.

What is claimed is:

1. An expansion-molded article of a polyolefin resin, said expansion-molded article having open voids, said expansion-molded article obtained by filling tubular foamed particles of the polyolefin resin into a mold and fusion-bonding the tubular foamed particles to one another under heat;

wherein said tubular foamed particles have a through-hole and satisfy the following relationship $$\frac{d_{MIN}}{D_{MIN}} = 0.25 - 0.85$$

wherein $d_{MIN}$ is a minimum diameter of said through-hole in sections perpendicular to the direction of the through-hole and is at least 1.5 mm and at most 10 mm, and $D_{MIN}$ is a minimum outer diameter of said tubular foamed particle in a section that $d_{MIN}$ has been provided, and wherein said expansion-molded article has a coefficient of water permeability of at least $4.0 \times 10^{-2}$ cm/sec.

2. The expansion-molded article according to claim 1, wherein a hydrophilicity-imparting agent is coated on the molded article.

3. The expansion-molded article according to claim 1, wherein a hydrophilicity-imparting agent is contained in the molded article.

4. The expansion-molded article according to claim 3, wherein the hydrophilicity-imparting agent is contained in a base resin forming the expansion-molded article to an extent that the contact angle of the base resin with water is narrower than 96 degrees.

5. The expansion-molded article according to any one of claims 2 to 4, wherein the hydrophilicity-imparting agent is at least one selected from polyhydric alcohol fatty acid esters.

6. The expansion-molded article according to claim 1, wherein $d_{MIN}$ is at most 5 mm.

7. The expansion-molded article according to claim 1, wherein said tubular foamed particles also satisfy the following relationship $$L/D=0.3-10$$

wherein D is a maximum outer diameter in said sections of said tubular foamed particle and L is a maximum length perpendicular to said sections.

* * * * *